US012572295B2

(12) United States Patent
Duttagupta et al.

(10) Patent No.: US 12,572,295 B2
(45) Date of Patent: ***Mar. 10, 2026

(54) DEDUPLICATED STORAGE DISK SPACE UTILIZATION

(71) Applicant: Cohesity, Inc., San Jose, CA (US)

(72) Inventors: Anirvan Duttagupta, San Jose, CA (US); Shreyas Talele, Santa Clara, CA (US); Anubhav Gupta, Sunnyvale, CA (US)

(73) Assignee: Cohesity, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,393

(22) Filed: Jun. 2, 2023

(65) Prior Publication Data

US 2023/0325099 A1 Oct. 12, 2023

Related U.S. Application Data

(63) Continuation of application No. 16/834,136, filed on Mar. 30, 2020, now Pat. No. 11,704,037.

(51) Int. Cl.
| | |
|---|---|
| *G06F 3/06* | (2006.01) |
| *G06F 16/901* | (2019.01) |
| *H04L 9/40* | (2022.01) |

(52) U.S. Cl.
CPC .......... *G06F 3/0641* (2013.01); *G06F 3/0608* (2013.01); *G06F 3/067* (2013.01); *G06F 16/9027* (2019.01); *H04L 63/20* (2013.01)

(58) Field of Classification Search
None
See application file for complete search history.

(56) References Cited

U.S. PATENT DOCUMENTS

| | | | |
|---|---|---|---|
| 9,798,629 B1 | 10/2017 | Shilane |
| 10,810,161 B1 | 10/2020 | Varadan |

(Continued)

FOREIGN PATENT DOCUMENTS

| | | |
|---|---|---|
| WO | 2017122263 | 7/2017 |

OTHER PUBLICATIONS

"Chunk." Published Sep. 5, 2023 by DevX. Accessed Oct. 22, 2024 from https://www.devx.com/terms/chunk/ (Year: 2023).*

(Continued)

*Primary Examiner* — Umar Mian
(74) *Attorney, Agent, or Firm* — Shumaker & Sieffert, P.A.

(57) ABSTRACT

A plurality of different views of data associated with a storage domain stored on a deduplicated storage are traversed to determine data chunks belonging to each view of the plurality of different views of data associated with the storage domain. A request for a metric associated with disk space utilization of a group of one or more selected views of data associated with the first storage domain included in the plurality of different views of data associated with the first storage domain that are stored on the deduplicated storage is received. Data chunks belonging to the one or more selected views of data associated with the first storage domain of the group are identified. An incremental disk space utilization of the group is determined, including by determining a total size of the identified data chunks. The metric associated with disk space utilization is provided based on the determined incremental disk space utilization of the group.

19 Claims, 16 Drawing Sheets

(56)  References Cited

U.S. PATENT DOCUMENTS

| | | | |
|---|---|---|---|
| 11,704,037 B2 | 7/2023 | Duttagupta et al. | |
| 2009/0144518 A1 | 6/2009 | Lewis | |
| 2009/0164853 A1 | 6/2009 | Gokhale | |
| 2010/0281081 A1* | 11/2010 | Stager | G06F 9/5022 |
| | | | 707/814 |
| 2010/0333116 A1 | 12/2010 | Prahlad | |
| 2012/0131301 A1* | 5/2012 | Maeda | G06F 16/13 |
| | | | 711/171 |
| 2015/0293817 A1 | 10/2015 | Subramanian | |
| 2016/0366226 A1* | 12/2016 | Friedman | G06F 3/0608 |
| 2017/0255643 A1* | 9/2017 | Maheshwari | G06F 16/1748 |
| 2019/0354442 A1 | 11/2019 | Yeger | |
| 2020/0174671 A1 | 6/2020 | Margaglia | |
| 2020/0174892 A1 | 6/2020 | Muehge | |

OTHER PUBLICATIONS

Prosecution History from U.S. Appl. No. 16/834,136, now issued U.S. Pat. No. 11,704,037, dated Feb. 11, 2021 through Mar. 8, 2023, 138 pp.

* cited by examiner

400

| TreeID | NodeID | ChildrenID | Ref Count | Value | ChunkID | Chunk FileID |
|--------|--------|------------|-----------|-------|---------|--------------|
| 1 | FR1 | FI1, FI2 | 0 | | | |
| 1 | FI1 | FL1, FL2, FL3, FL4 | 2 | | | |
| 1 | FI2 | FL5, FL6, FL7, FL8 | 1 | | | |
| 1 | FL1 | | 1 | Brick 1 | SHA-1$_a$ | Chunk File 1 |
| 1 | FL2 | | 1 | Brick 2 | SHA-1$_b$ | Chunk File 1 |
| 1 | FL3 | | 1 | Brick 3 | SHA-1$_c$ | Chunk File 1 |
| 1 | FL4 | | 1 | Brick 4 | SHA-1$_d$ | Chunk File 1 |
| 1 | FL5 | | 2 | Brick 5 | SHA-1$_e$ | Chunk File 2 |
| 1 | FL6 | | 2 | Brick 6 | SHA-1$_f$ | Chunk File 2 |
| 1 | FL7 | | 2 | Brick 7 | SHA-1$_g$ | Chunk File 2 |
| 1 | FL8 | | 1 | Brick 8 | SHA-1$_h$ | Chunk File 2 |
| 2 | FR2 | FI1, FI3 | 0 | | | |
| 2 | FI3 | FL5, FL6, FL7, FL9 | 1 | | | |
| 2 | FL9 | | 1 | Brick 8' | SHA-1$_i$ | Chunk File 3 |

450

| Chunk File ID | Chunk ID | Chunk File Offset | Storage Node | Primary Owner | Secondary Owner |
|---|---|---|---|---|---|
| Chunk File 1 | SHA-1$_a$ | 0 – 256 kb | 1, 3 | File 1 | File 2 |
| Chunk File 1 | SHA-1$_b$ | 256 kb – 512 kb | 1, 3 | File 1 | File 2 |
| Chunk File 1 | SHA-1$_c$ | 512 kb – 768 kb | 1, 3 | File 1 | File 2 |
| Chunk File 1 | SHA-1$_d$ | 768 kb – 1024 kb | 1, 3 | File 1 | File 2 |
| Chunk File 2 | SHA-1$_e$ | 0 – 256 kb | 2, 4 | File 1 | File 2 |
| Chunk File 2 | SHA-1$_f$ | 256 kb – 512 kb | 2, 4 | File 1 | File 2 |
| Chunk File 2 | SHA-1$_g$ | 512 kb – 768 kb | 2, 4 | File 1 | File 2 |
| Chunk File 2 | SHA-1$_h$ | 768 kb – 1024 kb | 2, 4 | File 1 | - |
| Chunk File 3 | SHA-1$_i$ | 0 – 256 kb | 2, 3 | File 2 | - |

FIG. 4B

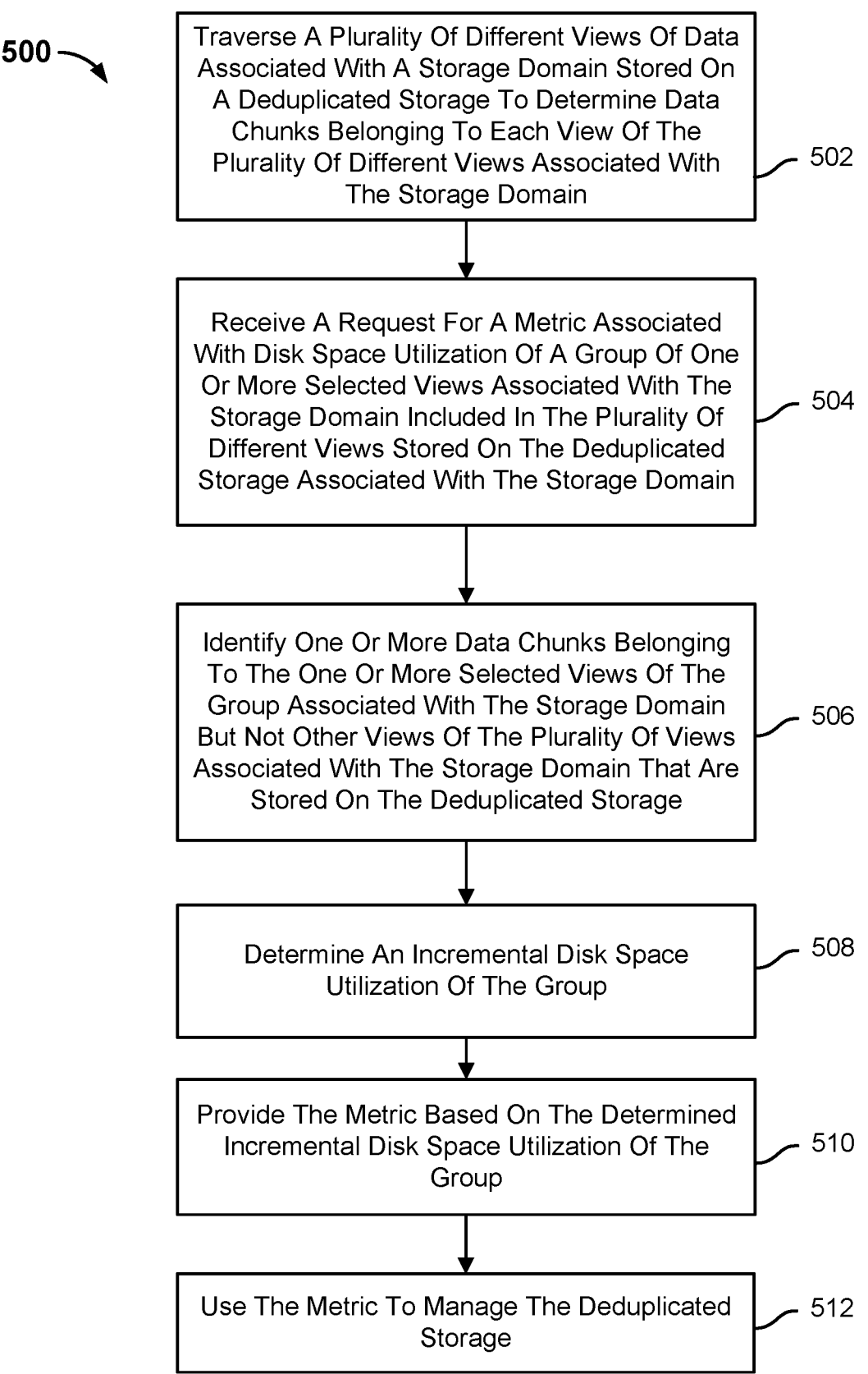

500

Traverse A Plurality Of Different Views Of Data Associated With A Storage Domain Stored On A Deduplicated Storage To Determine Data Chunks Belonging To Each View Of The Plurality Of Different Views Associated With The Storage Domain — 502

Receive A Request For A Metric Associated With Disk Space Utilization Of A Group Of One Or More Selected Views Associated With The Storage Domain Included In The Plurality Of Different Views Stored On The Deduplicated Storage Associated With The Storage Domain — 504

Identify One Or More Data Chunks Belonging To The One Or More Selected Views Of The Group Associated With The Storage Domain But Not Other Views Of The Plurality Of Views Associated With The Storage Domain That Are Stored On The Deduplicated Storage — 506

Determine An Incremental Disk Space Utilization Of The Group — 508

Provide The Metric Based On The Determined Incremental Disk Space Utilization Of The Group — 510

Use The Metric To Manage The Deduplicated Storage — 512

FIG. 5

600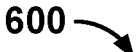
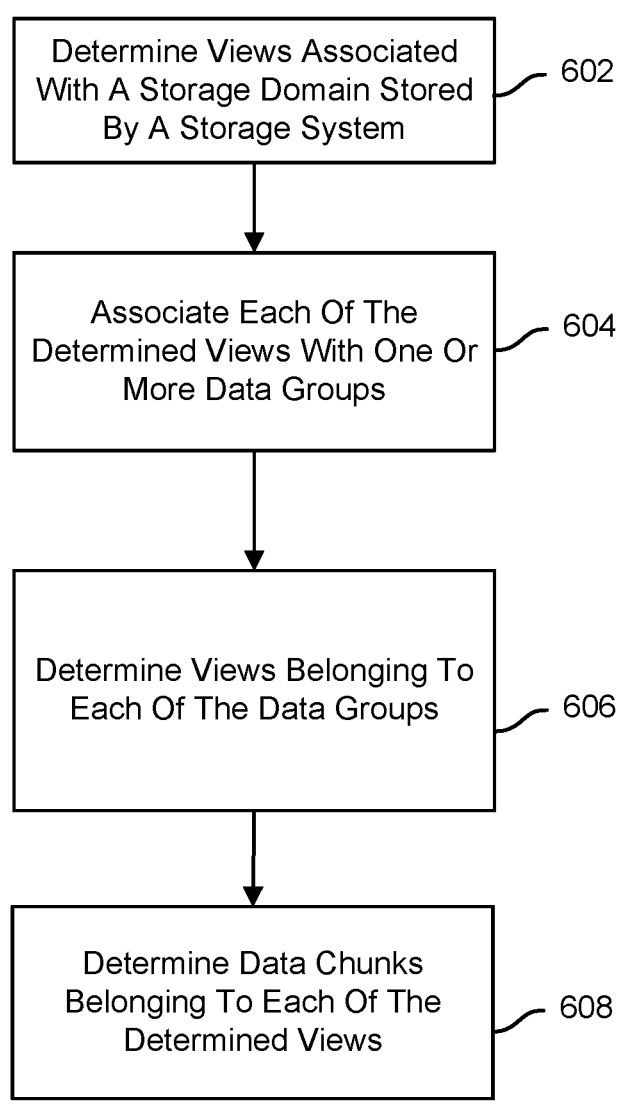
FIG. 6

700

Provide A User Interface That At Least Includes A Metric Associated With Disk Space Utilization Of A Group Associated With A Storage Domain — 702

Receive One Or More User Inputs — 704

Determine One Or More Adjusted Metrics Associated With Disk Space Utilization Based On The One Or More Received User Inputs — 706

Update The User Interface — 708

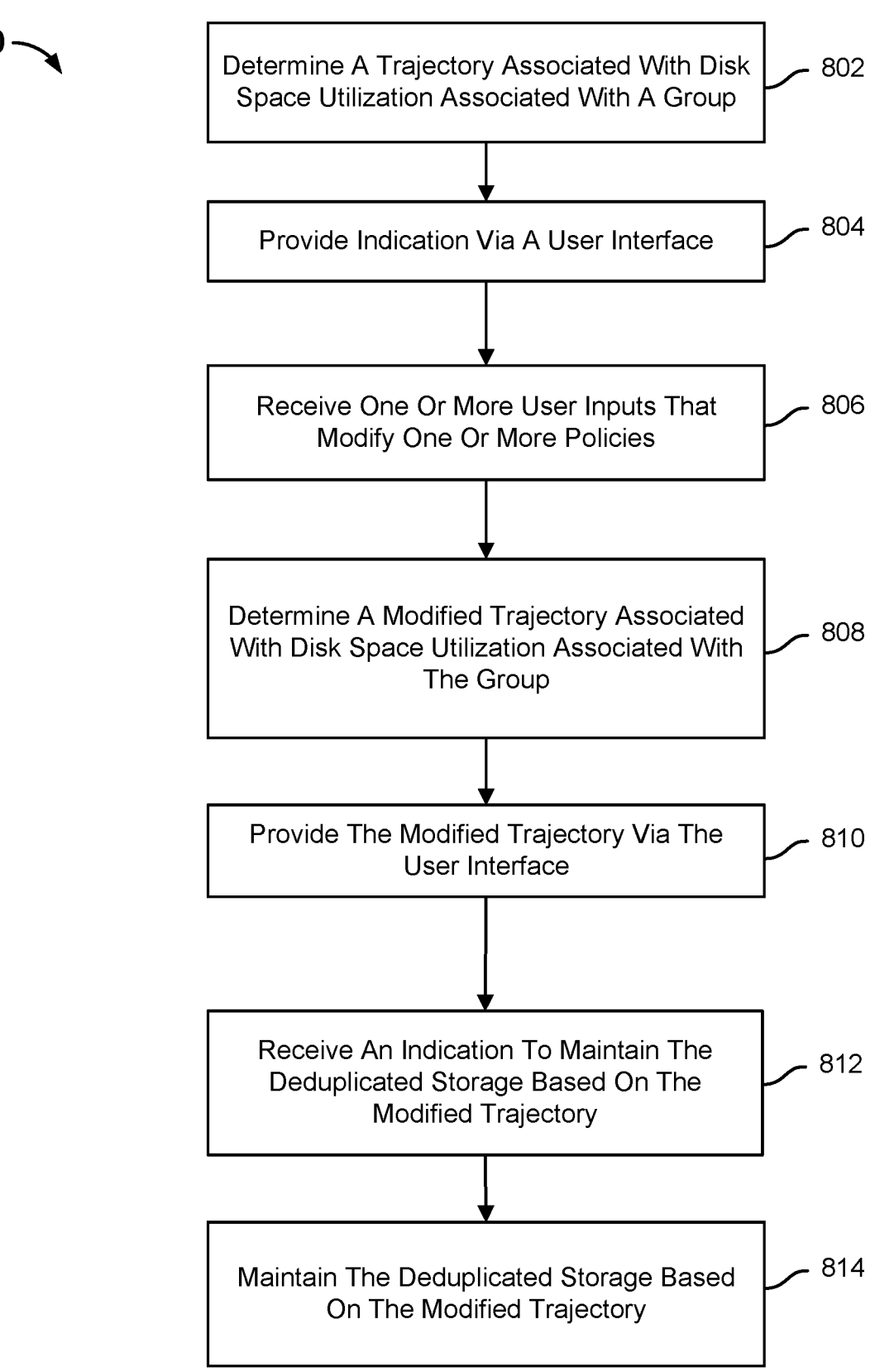

800

Determine A Trajectory Associated With Disk Space Utilization Associated With A Group — 802

Provide Indication Via A User Interface — 804

Receive One Or More User Inputs That Modify One Or More Policies — 806

Determine A Modified Trajectory Associated With Disk Space Utilization Associated With The Group — 808

Provide The Modified Trajectory Via The User Interface — 810

Receive An Indication To Maintain The Deduplicated Storage Based On The Modified Trajectory — 812

Maintain The Deduplicated Storage Based On The Modified Trajectory — 814

FIG. 8

DEDUPLICATED STORAGE DISK SPACE UTILIZATION

CROSS REFERENCE TO OTHER APPLICATIONS

This application is a continuation of U.S. patent application Ser. No. 16/834,136 entitled DEDUPLICATED STORAGE DISK SPACE UTILIZATION filed Mar. 30, 2020 which is incorporated herein by reference for all purposes.

BACKGROUND OF THE INVENTION

A storage system stores data and deduplicates the data to save storage space. An entity associated with the storage system (e.g., storage provider, cloud storage provider, service provider etc.) may charge a data group for storage capacity. A data group may correspond to a user, an individual, an enterprise, a government, a company, an organization, etc. The entity associated with the storage system may charge the data group for additional storage capacity. The data group may desire to reduce the amount of storage capacity used. However, it is unclear how much storage space is reclaimed in the event some of the deduplicated data is deleted.

BRIEF DESCRIPTION OF THE DRAWINGS

Various embodiments of the invention are disclosed in the following detailed description and the accompanying drawings.

FIG. 4B is a diagram illustrating a data structure in accordance with some embodiments.

FIG. 5 is a flow chart illustrating a process for managing a storage capacity of a storage system in accordance with some embodiments.

FIG. 6 is a flow chart illustrating a process for associating data chunks with views of data in accordance with some embodiments.

FIG. 8 is a flow chart illustrating a process for managing a deduplicated storage in accordance with some embodiments.

DETAILED DESCRIPTION

Figure 1:
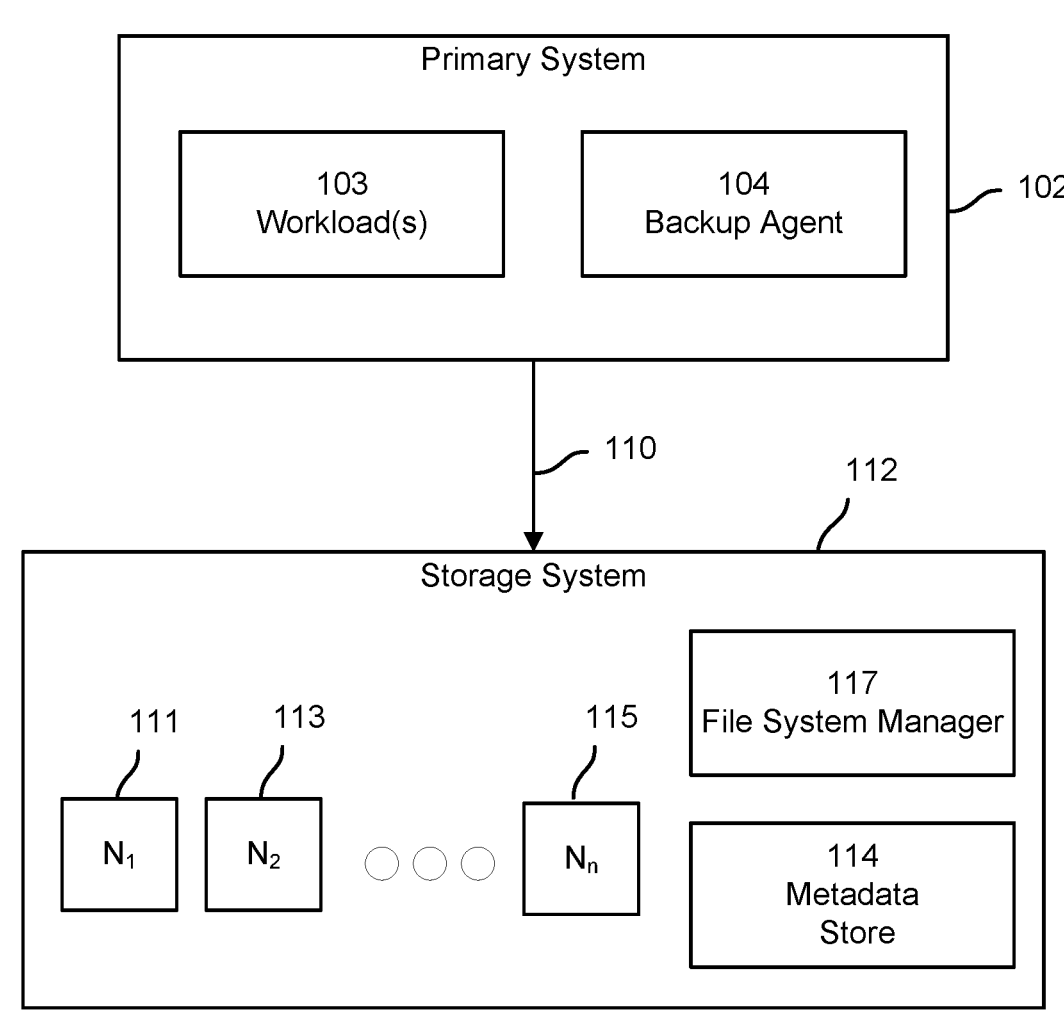
FIG. 1 is a block diagram illustrating a system for storing deduplicated data in accordance with some embodiments.

A primary system is comprised of one or more computing systems. Data associated with the primary system may be backed up from the primary system to a storage system. In some embodiments, data is generated on or by the storage system (e.g., a system generated file, a user generated file, an application generated file, etc.). The storage system is configured to deduplicate the stored data associated with a storage domain to save storage space. The storage system may store data associated with one or more data groups. In some embodiments, a storage domain is associated with a data group. In some embodiments, a storage domain is associated with a plurality of data groups. In some embodiments, a storage domain is associated with a sub data group. In some embodiments, a storage domain is associated with one or more file types associated with a data group or a sub data group.

An entity associated with the storage system may charge a data group a certain amount of money for storage capacity. At some point in time, the data group may use all or almost all (within a threshold amount) of the provisioned storage capacity. The data group may delete some of the data associated with the data group or purchase additional storage to increase the available storage capacity associated with the data group. However, it may be unclear how much storage will be reclaimed in the event one or more items associated with the data group are deleted from the storage system because the storage system is configured to deduplicate data across a storage domain associated with the data group. For example, a storage domain may include data associated with a workload and a user associated with a data group may select to delete the workload (e.g., file, virtual machine, database, container, pod, filesystem, etc.) having a size of 100 GB, but deleting the workload from the storage system does not reduce the storage space used by the storage domain associated with the data group by 100 GB because portions of the 100 GB workload have been deduplicated, meaning that at least some of the data is still referenced so it cannot be removed from the physical storage (e.g., deleting the 100 GB workload may free up 20 GB of storage space). Furthermore, the user associated with the data group may not have realized its protection jobs (e.g., backup, restore, migration, data replication, disaster recovery, etc.) were causing the storage system to use all or almost all of the provisioned storage capacity. Even if the data group were to purchase additional storage capacity, the user associated with the data group may not know how long the additional storage space will suffice until even more additional storage capacity needs to be purchased.

The storage system stores the data associated with the data group and organizes the data associated with the data group using a tree data structure. The storage system is configured to generate a plurality of views for the data associated with a data group. A view may correspond to a particular moment in time for the data associated with the data group. For example, a view may be generated each time data associated with the data group is backed up from the primary system to the storage system. A view may be generated each time a different version of data associated with a data group that is generated on or by the storage system is generated. A view may be generated when a data group desires to use backup data for test/development purposes. A view may correspond to file system data associated with the primary system. A view may correspond to a file associated with the primary system. A view may correspond to a file generated on or by the storage system.

Each view associated with a data group has a corresponding tree data structure. A view associated with the data group may be comprised of a snapshot tree, which may be based on a B+ tree structure (or other type of tree structure in other embodiments) and one or more metadata structures. A snapshot tree includes a root node, one or more levels of one or more intermediate nodes associated with the root node, and one or more leaf nodes associated with an intermediate node of the lowest intermediate level. The root node of a snapshot tree includes one or more pointers to one or more intermediate nodes. Each intermediate node includes one or more pointers to other nodes (e.g., a lower intermediate node or a leaf node). A leaf node may store file system metadata, data associated with a content file that is less than or equal to a limit size (e.g., 256 kB), an identifier of a data brick, one or more pointers to one or more metadata structures (e.g., Blob structure), a pointer to a data chunk stored on the storage system, etc. A leaf node of the snapshot tree may correspond to an inode.

A content file that is greater than the limit size (e.g., 256 kB) has an associated metadata structure. The metadata structure is configured to store the file metadata associated with a content file. The metadata structure includes a root node, one or more levels of one or more intermediate nodes associated with the root node, and one or more leaf nodes associated with an intermediate node of the lowest intermediate level. A metadata structure is similar to a snapshot tree, but a leaf node of a metadata structure includes an identifier of a data brick associated with one or more data chunks of the content file.

The location of the one or more data chunks associated with a data brick may be identified using one or more data structures (e.g., list, table, etc.). A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure.

The storage system may deduplicate data chunks for a storage domain and keep a record of the deduplicated data chunks for the storage domain by having a plurality of entries of a chunk metadata table reference the same chunk identifier and the same chunk file identifier. For example, the chunk metadata table may include a first entry associated with a first view that includes a first brick identifier that is associated with a first chunk identifier and a first chunk file identifier. The first chunk identifier corresponds to a first data chunk. The chunk metadata table may include a second entry associated with a second view that includes a second brick identifier that is associated with the first chunk identifier and the first chunk file identifier.

To determine how much space is reclaimed by deleting one or more selected views of data associated with a storage domain, the storage system may traverse a plurality of views of data associated with the storage domain stored by the storage system. The storage system may determine data chunks belonging to each view of the plurality of views of data associated with a storage domain based on traversing the plurality of views of data associated with the storage domain. In some embodiments, a data chunk belongs to a single view, i.e., the data chunk is not deduplicated. In some embodiments, a data chunk belongs to a plurality of views, i.e., the data chunk is deduplicated. For example, a first data chunk $C_1$ may be belong to views $V_1$, $V_2$, $V_3$, and $V_4$, a second data chunk $C_2$ may belong to views $V_1$, $V_3$, and $V_4$, and a third data chunk $C_3$ may belong to views $V_2$ and $V_4$. In some embodiments, the one or more selected views are included in a storage domain associated with a first data group and the other views of the plurality of different views stored on a storage system are included in the storage domain associated with the first data group. In some embodiments, a storage domain includes the first data group and one or more other data groups, and the one or more selected views are associated with the first data group and the other views of the plurality of different views stored on the storage system are associated with the first data group and the one or more other data groups. In some embodiments, a storage domain includes a first data group and one or more other data groups, and the one or more selected views are associated with the first data group and the other views of the plurality of different views stored on the storage system are associated with the one or more other data groups. In some embodiments, a storage domain includes a sub data group of a first data group, and the one or more selected views are associated with the sub data group of the first data group and the other views of the plurality of different views stored on the storage system are associated with the sub data group of the first data group.

The storage system may receive a request for a metric associated with disk space utilization of a group of one or more selected views of data associated with a storage domain included in the plurality of views of data associated with the storage domain stored by the storage system. The metric associated with disk space utilization may be an amount of provisioned storage capacity being used by the one or more selected views of the group, an amount of provisioned storage capacity being used by the one or more selected views of the group that is deduplicated across the storage domain, an amount of storage capacity (attributed or actual physical) being used by the one or more selected views of the group, a rate at which the data associated with the group is using the storage capacity provisioned to the data group by an entity associated with the storage space, an expected amount of time before the data associated with the group uses the complete amount of storage capacity provisioned to the data group by an entity associated with the storage space, a desired amount of storage capacity to be reclaimed, etc. A user associated with a data group may select the one or more views to be included in the group based on one or more factors, such as a time range, a timestamp, a file type, file size, the size of data associated with a view, a protection job type associated with the view, etc.

The storage system may identify data chunks belonging to the one or more selected views of data associated with the storage domain of the group but not other views of the plurality of different views of data associated with the storage domain that are stored on the storage system. For example, the storage system may store views $V_1$, $V_2$, $V_3$, $V_4$, which are associated with a storage domain. The user associated with the data group to which the storage domain is associated may select the group to be comprised of views $V_2$ and $V_4$ from views $V_1$, $V_2$, $V_3$, $V_4$. $V_2$ includes data chunks $C_1$ and $C_3$, but only data chunk $C_3$ belongs to the one or more selected views of data associated with the storage domain of the group but not other views of the plurality of different views of data associated with the storage domain that are stored on the storage system because data chunk $C_1$ also belongs to views $V_1$ and $V_3$, which are views that are not included in the selected group. $V_4$ includes data chunks $C_1$, $C_2$, and $C_3$, but only data chunk $C_3$ belongs to the one or more selected views of data associated with the storage domain of the group but not other views of the plurality of different views of data associated with the storage domain that are stored on the storage system because data chunk $C_1$ also belongs to views $V_1$ and $V_3$ and data chunk $C_2$ also belongs to views $V_1$ and $V_3$, which are views that are not included in the selected group. In this example, the storage system identifies data chunk $C_3$ from the selected views $V_2$, $V_4$.

The storage system may determine an incremental disk space utilization of the group. The incremental disk space utilization of the group corresponds to the amount of storage capacity reclaimed in the event the selected one or more views of the group are deleted from the storage system.

In some embodiments, the amount of storage capacity reclaimed corresponds to the amount of attributed storage capacity reclaimed for the storage domain. A storage system may store data associated with a plurality of data groups. Each of the data groups may be associated with a corresponding storage domain. An entity associated with the storage system may separately charge each data group for storage capacity. The storage system may determine the amount of attributed storage capacity reclaimed based on the data associated with a data group associated with a first storage domain without taking into consideration the data associated with one or more other data groups associated with one or more other storage domains that are stored by the storage system. For example, the storage system may store 1 TB of data associated with a first data group associated with a first storage domain and 1 TB of data associated with a second data group associated with a second storage domain. In this example, suppose all of the data associated with the first storage domain is the same as the data associated with the second storage domain. In this case, deduplicating the data among the first storage and the second storage domain results in the actual physical storage capacity usage of 1 TB, however, the first data group and the second data group each have an attributed storage capacity of 1 TB. A user associated with the first data group may select to delete a group of views that is associated with 1 TB of data. 1 TB of attributed storage capacity may be reclaimed for the first data group in the event the selected views are deleted even though the storage system still stores the 1 TB of data, which is still attributed to the second data group. The first data group would have 1 TB of provisioned storage capacity to use after the views are deleted even though the storage system did not free up any physical storage space.

In some embodiments, the amount of storage capacity reclaimed corresponds to the amount of actual physical storage capacity reclaimed for the storage domain. For example, a storage system may store data for a single storage domain and the storage domain includes data associated with a plurality of data groups. The storage system may determine the amount of actual physical storage capacity reclaimed based on the data associated with the data group associated with a first storage domain while taking into consideration the data associated with one or more other data groups associated with one or more other storage domains that are stored by the storage system. In this example, suppose the storage system stores 1 TB of data associated with a first data group associated with a first storage domain and 1 TB of data associated with a second data group associated with a second storage domain. In this example, suppose all of the data associated with the first storage domain is the same as the data associated with the second storage domain. In this case, deduplicating the data among the first storage and second storage domains results in actual physical storage capacity usage of 1 TB. A user associated with the first data group may select to delete a group of views that is associated with 1 TB of data. 0 TB of actual physical storage capacity is reclaimed for the storage system in the event the selected views are deleted because the storage system still stores the 1 TB of data on behalf of the second data group.

The incremental disk space utilization for the group associated with the storage domain corresponds to the sum of the size of the identified data chunks belonging to the one or more selected views of data associated with the storage domain of the group but not other views of the plurality of different views of data associated with the storage domain stored on the storage system. For example, the storage system may determine the incremental disk space utilization for the group is the sum of the size of data chunks $C_3$. Thus, the amount of storage capacity reclaimed (attributed or actual physical) in this example is the size of data chunk $C_3$ in the event the selected views $V_2$ and $V_4$ are deleted from the storage system.

The storage system may provide via a user interface the metric associated with disk space utilization based on the determined incremental disk space utilization of the group. For example, the storage system may provide an amount of storage capacity used by the data associated with the one or more selected views and an amount of storage capacity reclaimed (attributed or actual physical) that corresponds to the incremental disk space utilization in the event the one or more selected views are deleted. In the above example, views $V_2$ and $V_4$ have an associated size. The size of view $V_2$ is the sum of the size of data chunks $C_1$ and $C_3$. The size of view $V_4$ is the sum of the size of data chunks $C_1$, $C_2$, and $C_3$. The total physical size of the data for the selected groups is $(C_1 + C_3)$ and $(C_1 + C_2 + C_3)$ and the incremental disk space utilization for the group is the size of data chunk $C_3$. The storage system may provide the amount of storage capacity used by the data associated with views $V_2$, $V_4$ and the amount of storage capacity reclaimed that corresponds to the size of data chunk $C_3$.

A user associated with the data group may use the provided metric associated with disk space utilization and the determined incremental disk space utilization of the group to manage the storage capacity provisioned for the data group. For example, the user associated with the data group may determine whether to delete some or all of the selected views of the group to increase the available storage capacity. The user associated with the data group may modify one or more policies associated with the storage system. For example, the user associated with the data group may modify a storage policy (e.g., retention policy, Recovery Point Objective or RPO policy, etc.) associated with a view such that the total number of days a view of data is stored by the storage system is reduced. This may increase the available storage capacity. The user associated with the data group may modify a protection policy (e.g., backup snapshot policy, replication policy, restoration policy, migration policy, disaster recovery policy, etc.) such that a frequency at which backups are performed is reduced. This may increase the available storage capacity for the data group.

FIG. 1 is a block diagram illustrating a system for storing deduplicated data in accordance with some embodiments. In the example shown, system 100 is comprised of primary system 102 and storage system 112. Primary system 102 is coupled to storage system 112 via connection 110. Connection 110 may be a wired or wireless connection. Connection 110 may be a LAN, WAN, intranet, the Internet, and/or a combination thereof.

Primary system 102 is a computing system that stores file system data. The file system data may include a plurality of files (e.g., content files, text files, etc.) and metadata associated with the plurality of files. Primary system 102 may be comprised of one or more servers, one or more computing devices, one or more storage devices, and/or a combination thereof. Primary system 102 may be configured to send a backup snapshot of file system data to storage system 112 according to one or more backup snapshot policies. In some embodiments, a backup snapshot policy indicates that file system data is to be backed up on a periodic basis (e.g., hourly, daily, weekly, monthly, etc.), when a threshold size of data has changed, or in response to a command from a user associated with primary system 102.

Primary system 102 may be configured to run one or more workloads 103. Examples of workloads include, but are not limited to, a virtual machine, a database, an application, a container, a pod, etc. Primary system 102 may include one or more storage volumes (not shown) that are configured to store file system data associated with primary system 102. The file system data associated with primary system 102 includes the data associated with the one or more workloads 103.

Backup agent 104 may be configured to cause primary system 102 to perform a backup snapshot (e.g., a full backup snapshot or incremental backup snapshot). A full backup snapshot may include all of the file system data of primary system 102 at a particular moment in time. In some embodiments, a full backup snapshot for a particular workload of the one or more workloads 103 is performed and the full backup snapshot of the particular workload includes all of the workload data associated with the particular workload at a particular moment in time. In some embodiments, backup agent 104 is running on primary system 102. In some embodiments, backup agent 104 is running in one of the one or more workloads 103. In some embodiments, a backup agent 104 is running on primary system 102 and a separate backup agent 104 is running in one of the one or more workloads 103. In some embodiments, a workload includes a backup function and is configured to perform a backup snapshot on its own without backup agent 104. In some embodiments, primary system 102 includes a backup function and is configured to perform a backup snapshot on its own without backup agent 104. In some embodiments, storage system 112 may provide instructions to primary system 102, causing primary system 102 to execute backup functions without the backup agent 104.

Storage system 112 is comprised of a storage cluster that includes a plurality of storage nodes 111, 113, 115. Although three storage nodes are shown, storage system 112 may be comprised of n storage nodes. The plurality of storage nodes may be comprised of one or more solid state drives, one or more hard disk drives, or a combination thereof. Each storage node may have its own corresponding processor. Storage system 112 may be configured to ingest a backup snapshot received from primary system 102 and configured to store the data associated with the backup snapshot across the storage cluster. Storage system 112 may be a cloud instantiation of a storage system. A configuration of a cloud instantiation of storage system 112 may be a replica of storage system 112. For example, storage system 112 may be comprised of three storage nodes, each storage node with a storage capacity of 10 TB. A cloud instantiation of storage system 112 may be comprised of three virtual nodes, each virtual node with a storage capacity of 10 TB. In other embodiments, a cloud instantiation of storage system 112 may have more storage capacity than storage system 112. In other embodiments, a cloud instantiation of storage system 112 may have less storage capacity than storage system 112. A data group may be provisioned some or all of the storage capacity associated with storage nodes 111, 113, 115.

Storage system 112 may receive and ingest the data associated with a backup snapshot. Storage system 112 may include a file system manager 117 that is configured to organize the file system data of the backup snapshot using a tree data structure. An example of the tree data structure is a snapshot tree, which may be based on a B+ tree structure (or other type of tree structure in other embodiments). Storage system 112 may store a plurality of tree data structures in metadata store 114. Storage system 112 may generate a snapshot tree and one or more metadata structures for each backup snapshot.

In the event the backup snapshot corresponds to all of the file system data of primary system 102, a view corresponding to the backup snapshot may be comprised of a snapshot tree and one or more workload metadata structures. The snapshot tree may be configured to store the metadata associated with primary system 102. A workload metadata structure may be configured to store the metadata associated with one of the one or more workloads 103. Each of the one or more workloads 103 may have a corresponding metadata structure.

In the event the backup snapshot corresponds to all of the workload data of one of the one or more workloads 103, a view corresponding to the backup snapshot may be comprised of a snapshot tree and one or more workload file metadata structures. The snapshot tree may be configured to store the metadata associated with one of the one or more workloads 103. A workload file metadata structure may be configured to store the metadata associated with a workload file included in the workload.

In the event data associated with a data group is generated on or by storage system 112, a view corresponding to the data associated with the data group generated on or by the storage system 112 may be comprised of a snapshot tree and one or more file metadata structures. The snapshot tree may be configured to store the metadata of the data associated with the data group generated on or by the storage system. A file metadata structure may be configured to store the metadata associated with a file included in the data associated with the data group generated on or by the storage system.

The tree data structure may be used to capture different views of data. A view of data may correspond to a full backup snapshot, an incremental backup snapshot, a clone of data, a file, etc. The tree data structure allows a chain of snapshot trees to be linked together by allowing a node of a later version of a snapshot tree to reference a node of a previous version of a snapshot tree. The previous version of the snapshot tree may correspond to an earlier backup snapshot. For example, a root node or an intermediate node of a snapshot tree corresponding to a second backup snapshot may reference an intermediate node or leaf node of a snapshot tree corresponding to a first backup snapshot.

A snapshot tree is a representation of a fully hydrated restoration point because it provides a complete view of a primary system, a workload, or data generated on or by the storage system at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 112 maintains fully hydrated restoration points. Any file associated with primary system 102, a workload at a particular time and the file's contents, or a file generated on or by the storage system, for which there is an associated reference restoration point, may be determined from the snapshot tree, regardless if the associated reference restoration was a full reference restoration point or an intermediate reference restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., workload metadata structure or a workload file metadata structure), a pointer to a data chunk stored on the storage cluster, node reservation information, file offset information associated with a combined metadata structure, etc.

A metadata structure (e.g., workload file metadata structure, workload metadata structure, file metadata structure) may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of a workload, a workload file, or a file to be linked together by allowing a node of a later version of a metadata structure to reference a node of a previous version of a metadata structure.

A leaf node of a metadata structure may store a value, such as an identifier of a data brick associated with one or more data chunks. The location of the one or more data chunks associated with a data brick may be identified using one or more data structures (e.g., list, table, etc.) stored in metadata store 114. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Some of the data chunks stored by storage system 112 are deduplicated. For example, a first data chunk may be associated with a first version of a first file that is included in a first view of data and a second version of the first file that is included in a second view of data. Some of the data chunks stored by storage system 112 are not deduplicated. For example, a second data chunk may be associated with a first version of the first file that is included in the first view of data, but is not associated with a second version of the first file that is included in the second view of data. The second data chunk of the first version of the first file may have been replaced with a third data chunk of the second version of the first file or the second data chunk of the first version of the first file may have been deleted from the second version of the first file.

Storage system 112 is configured to deduplicate the stored data associated with a storage domain to save storage space. Storage system 112 may store data associated with one or more data groups. In some embodiments, a storage domain is associated with a data group. In some embodiments, a storage domain is associated with a plurality of data groups. In some embodiments, a storage domain is associated with a subset of a data group, also called a sub data group. In some embodiments, a storage domain is associated with one or more file types associated with a data group or a sub data group. In some embodiments, the one or more data groups correspond to one or more tenants. Examples of tenants include, but are not limited to, an enterprise, a government, an individual, a company, an organization, departments within an organization, etc. In some embodiments, in the event storage system 112 stores data associated with a plurality of data groups that are each associated with corresponding storage domains, storage system 112 separately deduplicates data associated with each respective storage domain of the plurality of storage domains. For example, storage system 112 may store data associated with a first storage domain and data associated with a second storage domain. In this example, storage system 112 may deduplicate the data associated with the first storage domain and deduplicate the data associated with the second storage domain, but no data is deduplicated across the first and second storage domains; in this case, if the same 1 MB file existed in both the first and second storage domains, there would be no physical space savings and 2 MB of physical storage would be consumed in the storage system because the deduplicated data is not shared between the first and second storage domains. Storage system 112 may traverse a plurality of different views of data of the first data group without traversing a plurality of different views of data of the second data group to determine a metric associated with disk space utilization for the first data group.

In some embodiments, in the event storage system 112 stores data associated with a plurality of data groups that are included in a single storage domain, storage system 112 jointly deduplicates data associated with the plurality of data groups. For example, storage system 112 may store data associated with a first data group and data associated with a second data group. Storage system 112 may deduplicate the data associated with the first data group and deduplicate the data associated with the second data group, and the deduplicated data is shared between the first and second data groups. In this example, if the same 1 MB file existed in both the first and second storage domains, 1 MB of physical storage would be consumed in the storage system 112. Storage system 112 may traverse a plurality of different views of data of the first data group and traverse a plurality of different views of data of the second data group to determine a metric associated with disk space utilization for the first data group.

An entity associated with storage system 112 (e.g., a storage provider, a cloud storage provider, service provider, etc.) may charge a data group a certain amount of money for storage capacity. The data group may delete some of the data associated with the data group to reduce the amount of storage capacity used. For example, a data group may select one or more views of data stored by storage system 112 to delete. However, it may be unclear how much storage space will be reclaimed (attributed or actual physical) in the event one or more selected views of data associated with the data group are deleted from storage system 112 because storage system 112 is configured to deduplicate data associated with the data group. One or more data chunks included in a selected view associated with a storage domain may be deduplicated with one or more non-selected views of data associated with the storage domain. Thus, the amount of space reclaimed by deleting a selected view associated with a storage domain may be less than the actual size of the data associated with the selected view associated with the storage domain.

To determine how much space is reclaimed by deleting one or more selected views of data associated with a storage domain, storage system 112 may traverse a plurality of views of data associated with a storage domain that are stored by storage system 112. In some embodiments, storage system 112 is associated with a single storage domain comprised of a single data group and the plurality of views of data are associated with the single storage domain. In some embodiments, storage system 112 is associated with a single storage domain comprised of a plurality of data groups and the plurality of views of data are associated with the plurality of data groups. For example, a first subset of the plurality of views is associated with a first data group and a second subset of the plurality of views is associated with a second data group. Storage system 112 may determine the one or more views of data to which a data chunk is associated based on traversing the plurality of views of data associated with the first and second data groups. For example, storage system 112 may determine that a first data chunk $C_1$ belongs to views $V_1$, $V_2$, $V_3$, and $V_4$, a second data chunk $C_2$ belongs to views $V_1$, $V_3$, and $V_4$, and a third data chunk $C_3$ belongs to views $V_2$ and $V_4$.

Storage system 112 may use this information to determine the plurality of data chunks associated with a view of data associated with a storage domain. For example, storage system 112 may determine that view $V_1$ is comprised of data chunks $C_1$ and $C_2$, view $V_2$ is comprised of data chunks $C_1$ and $C_3$, view $V_3$ is comprised of data chunks $C_1$ and $C_2$, and view $V_4$ is comprised of data chunks $C_1$, $C_2$, and $C_3$. Storage system 112 may receive a request for a metric associated with disk space utilization of a group of one or more selected views included in the plurality of views of data associated with a storage domain that are stored by storage system 112. The metric associated with disk space utilization may be an amount of provisioned storage capacity being used by the one or more selected views of the group, an amount of provisioned storage capacity being used by the one or more selected views of the group that is deduplicated across the storage domain, an amount of storage capacity (attributed or actual physical) being used by the one or more selected views of the group, a rate at which the data associated with the group is using the storage capacity provisioned to the data group by an entity associated with the storage space, an expected amount of time before the data associated with the group uses the complete amount of storage capacity provisioned to the data group by an entity associated with the storage space, a desired amount of storage capacity to be reclaimed, etc. A user associated with a data group may select the one or more views to be included in the group based on one or more factors, such as a time range, a timestamp, a file type, file size, the size of data associated with a view, a protection job type associated with the view, etc.

In some embodiments, a data group corresponds to a tenant. The tenant may be comprised of a plurality of departments. Each of the departments may be associated with one or more views. The storage system may perform a plurality of protection job types for each department. Each instance of a protection job may have a corresponding view. The storage system may identify the one or more file types protected by a protection job. Each file may have an associated view. A user associated with the data group may select one or more views to be included in the group associated with the data group by selecting a combination of one or more departments associated with the data group, one or more protection job types associated with each of the one or more departments, and/or one or more file types to be included in the group associated with the data group. The user associated with the data group may also select the one or more views to be included in the group associated with the data group based on a time range (e.g., 01/01/2019-01/01/2020), a size of the data associated with a view (e.g., views of data having a size of at least 100 GB), etc.

The one or more selected views of data associated with a storage domain of the group are determined. Storage system 112 may store a data structure that associates a view of data with a data group. Storage system 112 may store a data structure that associates a view of data with one or more departments. Storage system 112 may store a data structure that associates a view of data with one or more protection jobs. Storage system 112 may store a data structure that associates a view of data with one or more file types. The data structure may associate a view of data with a timestamp. The data structure may associate a view of data with a size.

Storage system 112 may identify data chunks belonging to the one or more selected views of data associated with the storage domain of the group but not other views of the plurality of different views stored on storage system 112. For example, $V_2$ includes data chunks $C_1$ and $C_3$, but only data chunk $C_3$ belongs to the one or more selected views of data associated with the storage domain of the group but not other views of the plurality of different views of data associated with the storage domain that are stored on the storage system because data chunk $C_1$ also belongs to views $V_1$ and $V_3$, which are views that are not included in the selected group. $V_4$ includes data chunks $C_1$, $C_2$, and $C_3$, but only data chunk $C_3$ belongs to the one or more selected views of data associated with the storage domain of the group but not other views of the plurality of different views of data associated with the storage domain that are stored on the storage system because data chunk $C_1$ also belongs to views $V_1$ and $V_3$ and data chunk $C_2$ also belongs to views $V_1$ and $V_3$, which are views that are not included in the selected group. In some embodiments, the one or more selected views are associated with a first data group associated with the storage domain and the other views of the plurality of different views stored on storage system 112 are associated with the first data group associated with the storage domain. In some embodiments, the one or more selected views are associated with a first data group associated with the storage domain and the other views of the plurality of different views stored on storage system 112 are associated with the first data group associated with the storage domain and one or more other data groups associated with the storage domain. In some embodiments, the one or more selected views are associated with a first data group associated with the storage domain and the other views of the plurality of different views stored on storage system 112 are associated with one or more other data groups associated with the storage domain.

Storage system 112 is configured to determine an incremental disk space utilization of the group by determining a size of data associated with the one or more identified data chunks. The incremental disk space utilization of the group corresponds to the amount of storage capacity reclaimed in the event the selected one or more views of the group are deleted from storage system 112. In some embodiments, the amount of storage capacity reclaimed corresponds to the amount of attributed storage capacity reclaimed for the storage domain. In some embodiments, the amount of storage capacity reclaimed corresponds to the amount of actual physical storage capacity reclaimed for the storage domain.

The incremental disk space utilization for the group corresponds to the sum of the size of the identified data chunks belonging to the one or more selected views of data associated with the storage domain of the group but not other views of the plurality of different views of data associated with the storage domain that are stored on the storage system. For example, the storage system may determine the incremental disk space utilization for the group is the sum of the size of data chunks $C_3$. Thus, the amount of storage capacity reclaimed in this example is the size of data chunk $C_3$ in the event the selected views $V_2$ and $V_4$ are deleted from the storage system.

In addition to the incremental disk space utilization of the group associated with the storage domain, storage system 112 may be configured to compute one or more other metrics. For example, storage system 112 may compute a deduplication ratio (e.g., how much deduplication (attributed or actual physical) was attained), compressibility of data (e.g., how much of the data was compressed), deduplicability of data (e.g., how much of the data could be deduped (attributed or actual physical)), logical usage, resiliency of the data, deduplication savings (e.g., the amount of bytes saved by deduplication), compression savings, etc. In some embodiments, storage system 112 computes total amount of garbage stored by subtracting the size of data chunks that are referenced by the storage domain from the total amount of disk data. The total amount of disk data may be determined by adding up a size of the physical files of the storage domain. A user associated with a data group may use the one or more other metrics to manage storage system 112.

Storage system 112 may provide to a user associated with a data group via a user interface the determined incremental disk space utilization of the group. In some embodiments, the user interface receives from the user associated with the data group a command to delete the one or more selected views and in response to the command, storage system 112 is configured to delete the one or more identified data chunks. In some embodiments, the user interface receives a selection of a different group comprised of one or more views of data associated with the storage domain and in response to the selection, storage system 112 is configured to determine an incremental disk space utilization of the different group. The different group comprised of one or more views may include all, some, or none of the views that are included in the previous group.

Storage system 112 may determine a corresponding incremental disk space utilization for each view associated with the storage domain included in the group. Storage system 112 may determine a corresponding incremental disk space utilization for each department included in the group. Storage system 112 may determine a corresponding incremental disk space utilization for each protection job type included in the group. Storage system 112 may determine a corresponding incremental disk space utilization for each file type included in the group. Storage system 112 may determine a corresponding incremental disk space utilization for each file included in the group. Storage system 112 may provide this information to a user associated with a data group via a user interface.

In response to receiving the information, the user associated with the data group may modify a manner in which the provisioned storage capacity associated with storage system 112 is managed.

A user associated with a data group may modify the manner in which storage system 112 stores data associated with the data group. The user associated with the data group may modify one or more policies associated with the storage system. The storage system may include one or more storage policies and/or one or more protection policies. For example, a storage policy, such as a retention policy associated with a data group, may indicate that a view is to be stored by storage system 112 for 90 days. The user associated with the data group may modify the retention policy associated with the data group such that a view is to be stored by storage system 112 for 30 days instead of 90 days. This may increase the available storage capacity associated with the data group. A protection policy, such as a backup snapshot policy associated with a data group, may indicate that a backup snapshot is to be performed every 12 hours and a view corresponding to the backup snapshot is generated and stored by storage system 112 every 12 hours. The user associated with the data group may modify the protection policy associated with the data group such that a backup snapshot is performed every 24 hours and a view corresponding to the backup snapshot is generated and stored by storage system 112 every 24 hours. Modifying the protection policy and/or the storage policy may reduce the rate at which a data group uses provisioned storage capacity.

Figure 2A:
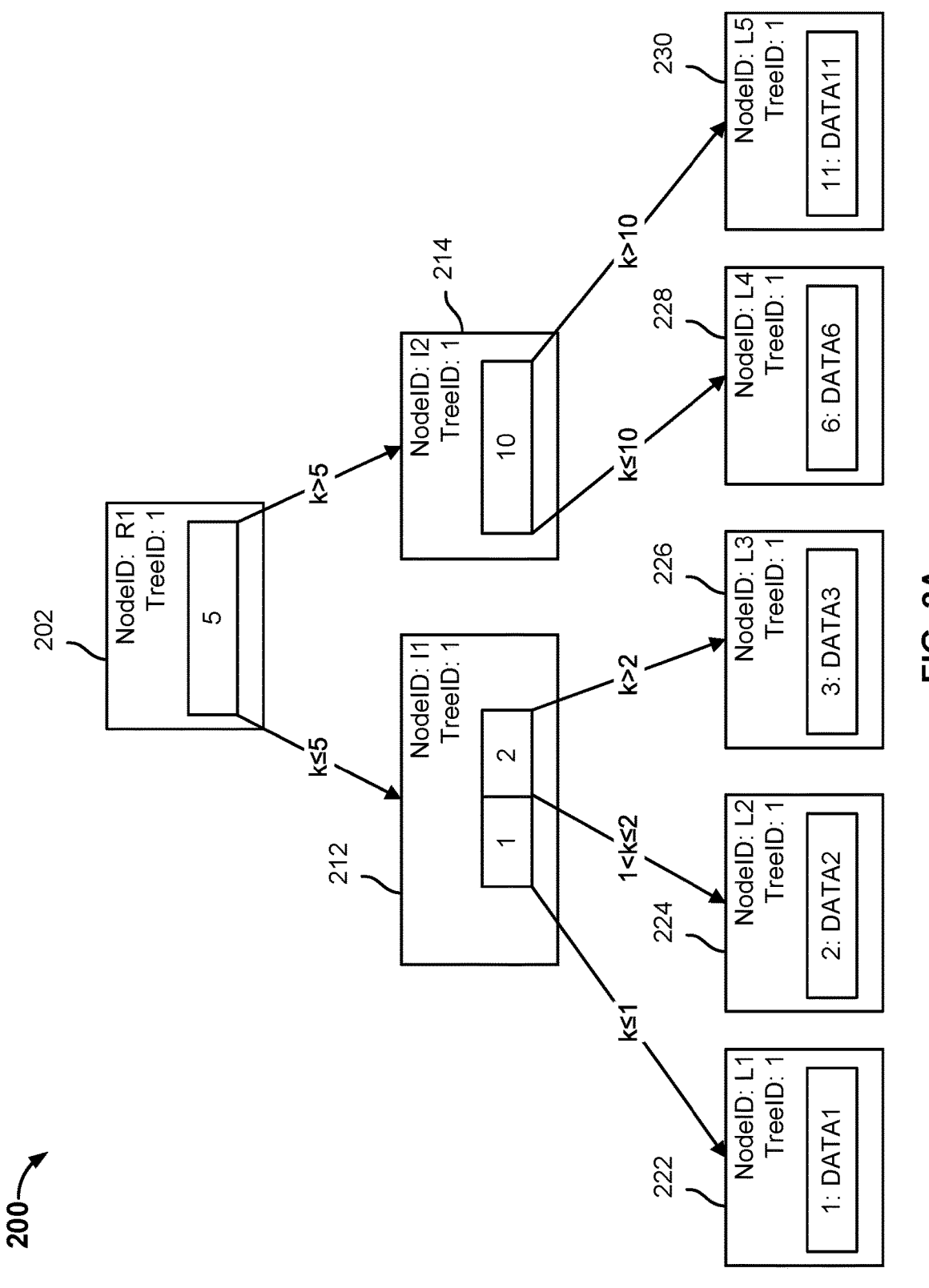
FIG. 2A is a block diagram illustrating an embodiment of a tree data structure.

FIG. 2A is a block diagram illustrating an embodiment of a tree data structure. A tree data structure may be used to represent a view of file system data that is stored on a storage system, such as storage system 112. The file system data may include metadata for a distributed file system and may include information, such as chunk identifier, chunk offset, file size, directory structure, file permissions, physical storage locations of the content files, etc. A file system manager, such as file system manager 117, may generate tree data structure 200. Tree data structure 200 may correspond to a full backup snapshot.

Tree data structure 200 is comprised of a snapshot tree that includes root node 202, intermediate nodes 212, 214, and leaf nodes 222, 224, 226, 228, 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time, for example, at time to. The backup snapshot may be received from a primary system, such as primary system 102. The snapshot tree in conjunction with a plurality of file metadata structures may provide a complete view of the primary system associated with the backup snapshot for the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node of the snapshot tree that does not have child nodes of the snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick number of a data brick. A data brick may be associated with one or more data blocks. In some embodiments, the leaf node is configured to store file system metadata (e.g., chunk identifier (e.g., hash value, SHA-1, etc.), file size, directory structure, file permissions, physical storage locations of the content files, etc.). A leaf node may store a data key k and a pointer to a location that stores the value associated with the data key. In some embodiments, a leaf node is configured to store the data associated with a content file, workload, or workload file when the size of the content file, workload, or workload file is less than or equal to a limit size (e.g., 256 kB). In some embodiments, a leaf node includes a pointer to a metadata structure (e.g., blob structure) when the size of data associated with a content file, workload, or workload file is larger than the limit size.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "5." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "5." To find a leaf node storing a value associated with a data key of "6" or "11," the second branch of root node 202 would be traversed to intermediate node 214 because data keys "6" and "11" are greater than the node key of "5."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "5." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key and may be used to determine which branch of a node is associated with a non-numerical data key. For example, a hash function may be applied to a non-numerical data key, resulting in a corresponding hash value; the hash value may be used to select which branch of a node is associated with the corresponding non-numerical data key. Accordingly, it can be determined that a first bucket is associated with a first branch of a node and a second bucket is associated with a second branch of the node.

In the example shown, root node 202 includes pointers to intermediate node 212 and intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "6, 11") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "6" or "11" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1," "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "6" or "11."

Intermediate node 212 includes pointers to leaf nodes 222, 224, 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes pointers to leaf nodes 228, 230. Intermediate node 214 includes a NodeID of "I2" and a TreeID of "1." Intermediate node 214 includes a node key of "10." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "6." The pointer to leaf node 230 indicates that traversing tree data structure 200 from intermediate node 214 to leaf node 230 will lead to the node with a data key of "11."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222. In some embodiments, leaf node 222 is configured to store metadata. In other embodiments, leaf node 222 is configured to store content file data when the size of the content file is less than or equal to a limit size. In other embodiments, leaf node 222 is a file inode and is configured to store a pointer to or an identifier of a metadata structure (e.g., workload metadata structure, workload file metadata structure, file metadata structure, file metadata tree).

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224. In some embodiments, leaf node 224 is configured to store metadata. In other embodiments, leaf node 224 is configured to store content file data when the size of the content file is less than or equal to a limit size. In other embodiments, leaf node 224 is a file inode and is configured to store a pointer to or an identifier of a metadata structure (e.g., workload metadata structure, workload file metadata structure, file metadata structure, file metadata tree).

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226. In some embodiments, leaf node 226 is configured to store metadata. In other embodiments, leaf node 226 is configured to store content file data when the size of the content file is less than or equal to a limit size. In other embodiments, leaf node 226 is a file inode and is configured to store a pointer to or an identifier of a metadata structure (e.g., workload metadata structure, workload file metadata structure, file metadata structure, file metadata tree).

Leaf node 228 includes a data key-value pair of "6: DATA6." Leaf node 228 includes NodeID of "L4" and a TreeID of "1." To view the value associated with a data key of "6," tree data structure 200 is traversed from root node 202 to intermediate node 214 to leaf node 228. In some embodiments, leaf node 228 is configured to store metadata. In other embodiments, leaf node 228 is configured to store content file data when the size of the content file is less than or equal to a limit size. In other embodiments, leaf node 228 is a file inode and is configured to store a pointer to or an identifier of a metadata structure (e.g., workload metadata structure, workload file metadata structure, file metadata structure, file metadata tree).

Leaf node 230 includes a data key-value pair of "11: DATA11." Leaf node 230 includes NodeID of "L5" and a TreeID of "1." To view the value associated with a data key of "11," tree data structure 200 is traversed from root node 202 to intermediate node 214 to leaf node 230. In some embodiments, leaf node 230 is configured to store metadata. In other embodiments, leaf node 230 is configured to store content file data when the size of the content file is less than or equal to a limit size. In other embodiments, leaf node 230 is a file inode and is configured to store a pointer to or an identifier of a metadata structure (e.g., workload metadata structure, workload file metadata structure, file metadata structure, file metadata tree).

Figure 2B:
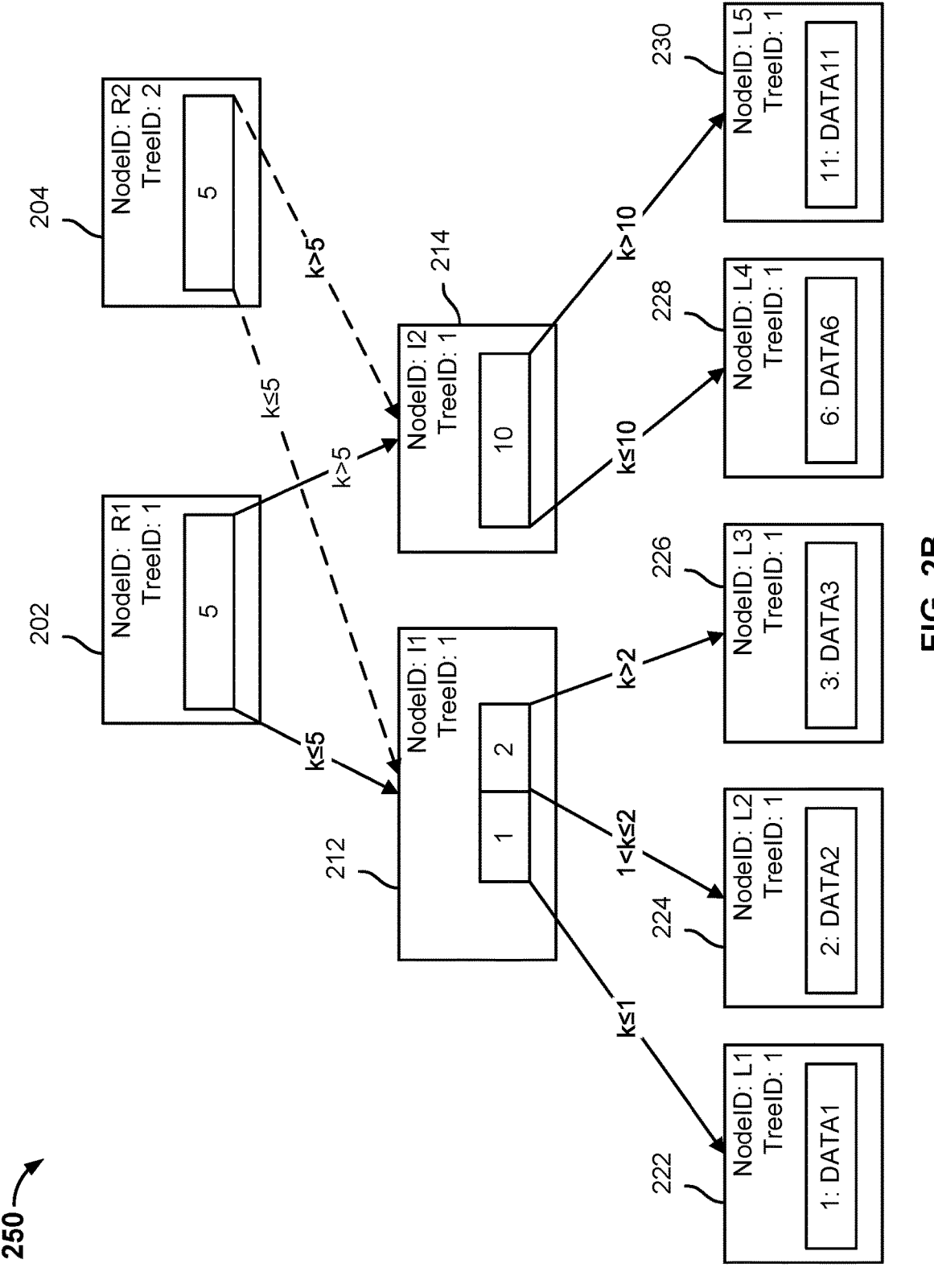
FIG. 2B is a block diagram illustrating an embodiment of a cloned snapshot tree.

FIG. 2B is a block diagram illustrating an embodiment of a cloned snapshot tree. A snapshot tree may be cloned when a snapshot tree is added to a tree data structure, when data associated with a snapshot tree is migrated, when data associated with a snapshot tree is restored, when data associated with a snapshot tree is replicated, when data associated with a snapshot tree is used for test/development purposes, etc. In some embodiments, tree data structure 250 may be created by a storage system, such as storage system 112. The file system data of a primary system, such as primary system 102, may be backed up to a storage system, such as storage system 112. A subsequent backup snapshot may correspond to an incremental backup snapshot. The manner in which the file system data corresponding to the subsequent backup snapshot is stored in a storage system may be represented by a tree data structure. The tree data structure corresponding to the subsequent backup snapshot is generated in part by cloning a snapshot tree associated with a previous backup snapshot.

In the example shown, tree data structure 250 includes root nodes 202, 204, intermediate nodes 212, 214, and leaf nodes 222, 224, 226, 228, and 230. Tree data structure 250 can be used to capture different versions of file system data at different moments in time. A tree data structure may also efficiently locate desired metadata by traversing a particular version of a snapshot tree included in the tree data structure. In some embodiments, the tree data structure allows a chain of backup snapshot versions (i.e., snapshot trees) to be linked together by allowing a node of a later version of a snapshot tree to reference a node of a previous version of a snapshot tree. For example, a snapshot tree with root node 204 is linked to a snapshot tree with root node 202. Each time a snapshot is performed, a new root node may be created and the new root node includes the same set of pointers included in the previous root node, that is the new root node of the snapshot may be linked to one or more intermediate nodes associated with a previous snapshot. The new root node also includes a different NodeID and a different TreeID.

In some embodiments, a root node is associated with a current view of the file system data. A current view may still accept one or more changes to the data. In the example shown, root node 204 is associated with a current view of the file system data. In other embodiments, a root node is associated with a snapshot view of the file system data. A snapshot view may represent a state of the file system data at a particular moment in time in the past and is not updated. In the example shown, root node 202 is associated with a snapshot view of the file system data.

To generate a snapshot tree corresponding to an incremental backup snapshot at $t_1$, root node 202 is cloned, i.e., copied. In the example shown, root node 204 is a copy of root node 202. Similar to root node 202, root node 204 includes the same pointers as root node 202, but includes a different NodeID and a different TreeID. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "6" or "11." Root node 204 includes a NodeID of "R2" and a TreeID of "2."

Figure 2C:
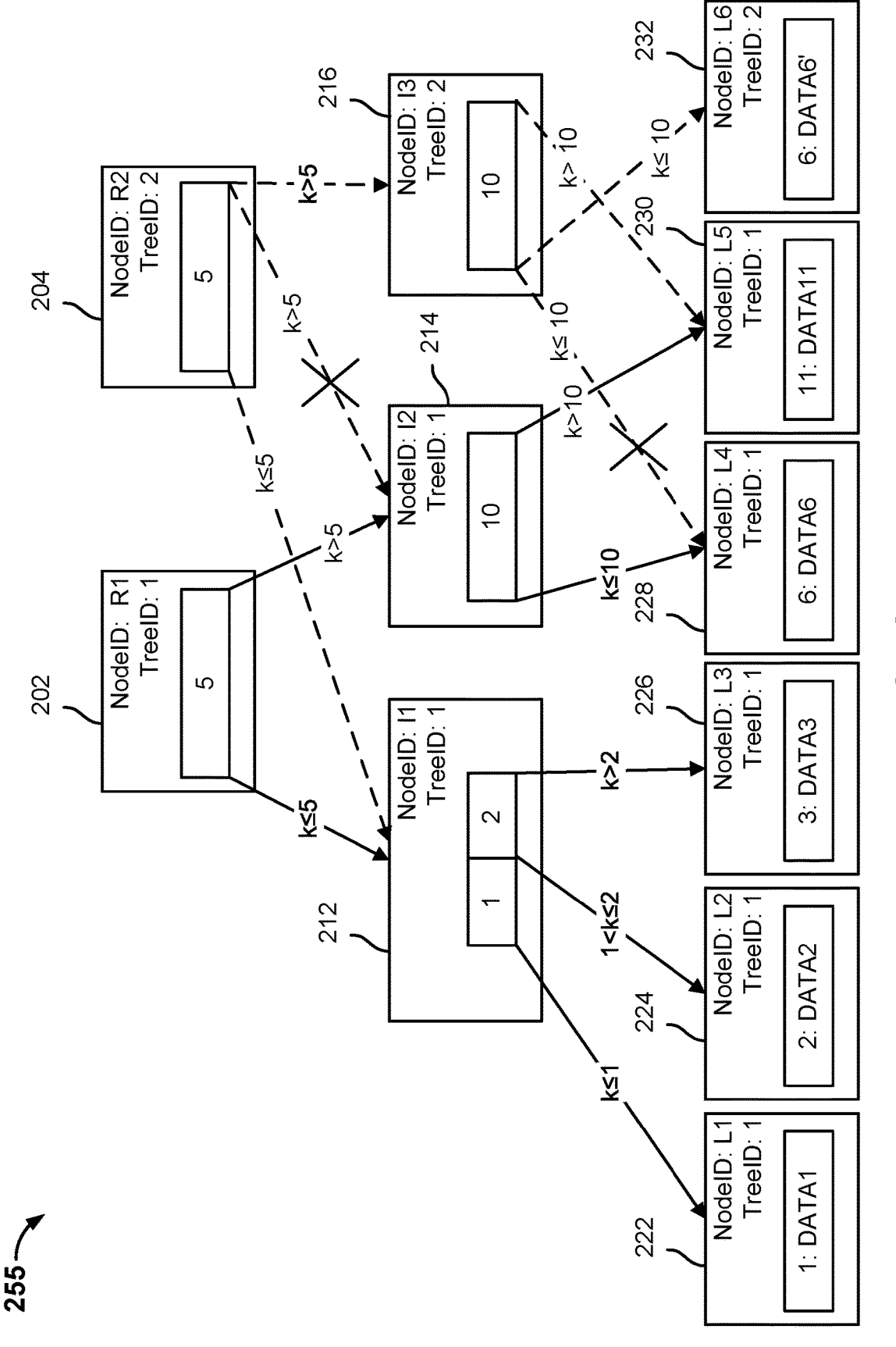
FIG. 2C is a block diagram illustrating an embodiment of modifying a cloned snapshot tree.

FIG. 2C is a block diagram illustrating an embodiment of modifying a cloned snapshot tree. In the example shown, tree data structure 255 may be modified by a file system manager, such as file system manager 117. A snapshot tree with a root node 204 may be a current view of the file system data, for example, at time $t_1$.

In the example shown, the value "DATA6" has been modified to be "DATA6'." In some embodiments, the value of a key value pair has been modified. In other embodiments, the value of the key value pair is the file data associated with a content file that is smaller than or equal to a limit size. In other embodiments, the value of the key value pair points to a different metadata structure (e.g., a metadata structure corresponding to a different version of a file). The different metadata structure may be a modified version of the metadata structure to which the leaf node previously pointed.

To modify the snapshot tree at $t_1$, the file system manager starts at root node 204 because that is the root node associated with the snapshot tree at time $t_1$. The value "DATA6" is associated with the data key "6." The file system manager traverses tree data structure 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "6," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA6" and includes the same TreeID as root node 204. The file system manager updates a pointer of intermediate node 216 to point to leaf node 232 instead of pointing to leaf node 228. In some embodiments, leaf node 232 stores the value of a key value pair that has been modified. In other embodiments, leaf node 232 stores the modified data associated with a content file that is smaller than or equal to a limit size.

Figure 2D:
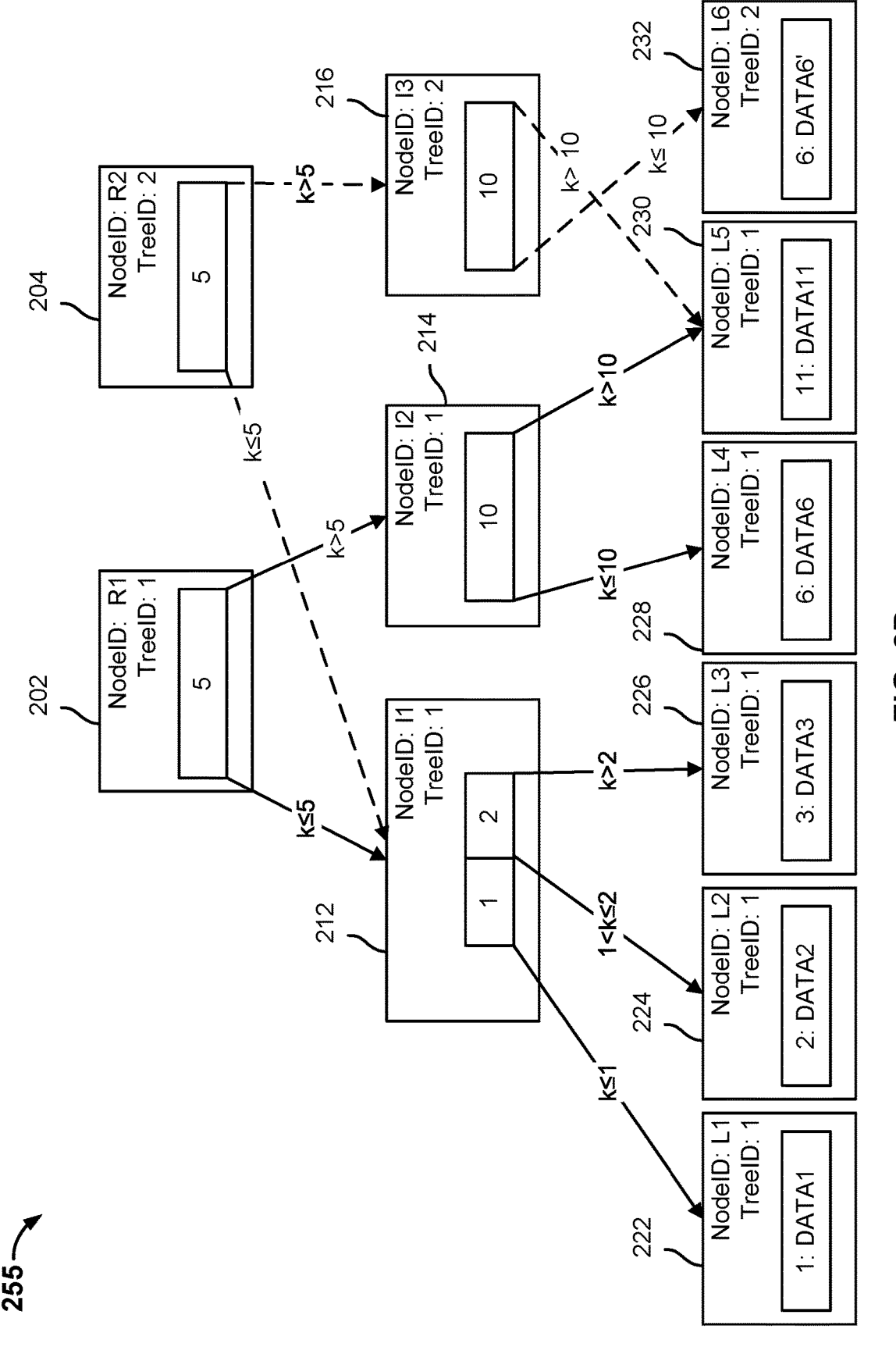
FIG. 2D is a block diagram illustrating an embodiment of a modified snapshot tree.

FIG. 2D is a block diagram illustrating an embodiment of a modified snapshot tree. Tree data structure 255 shown in FIG. 2D illustrates a result of the modifications made to a snapshot tree as described with respect to FIG. 2C.

Figure 3A:
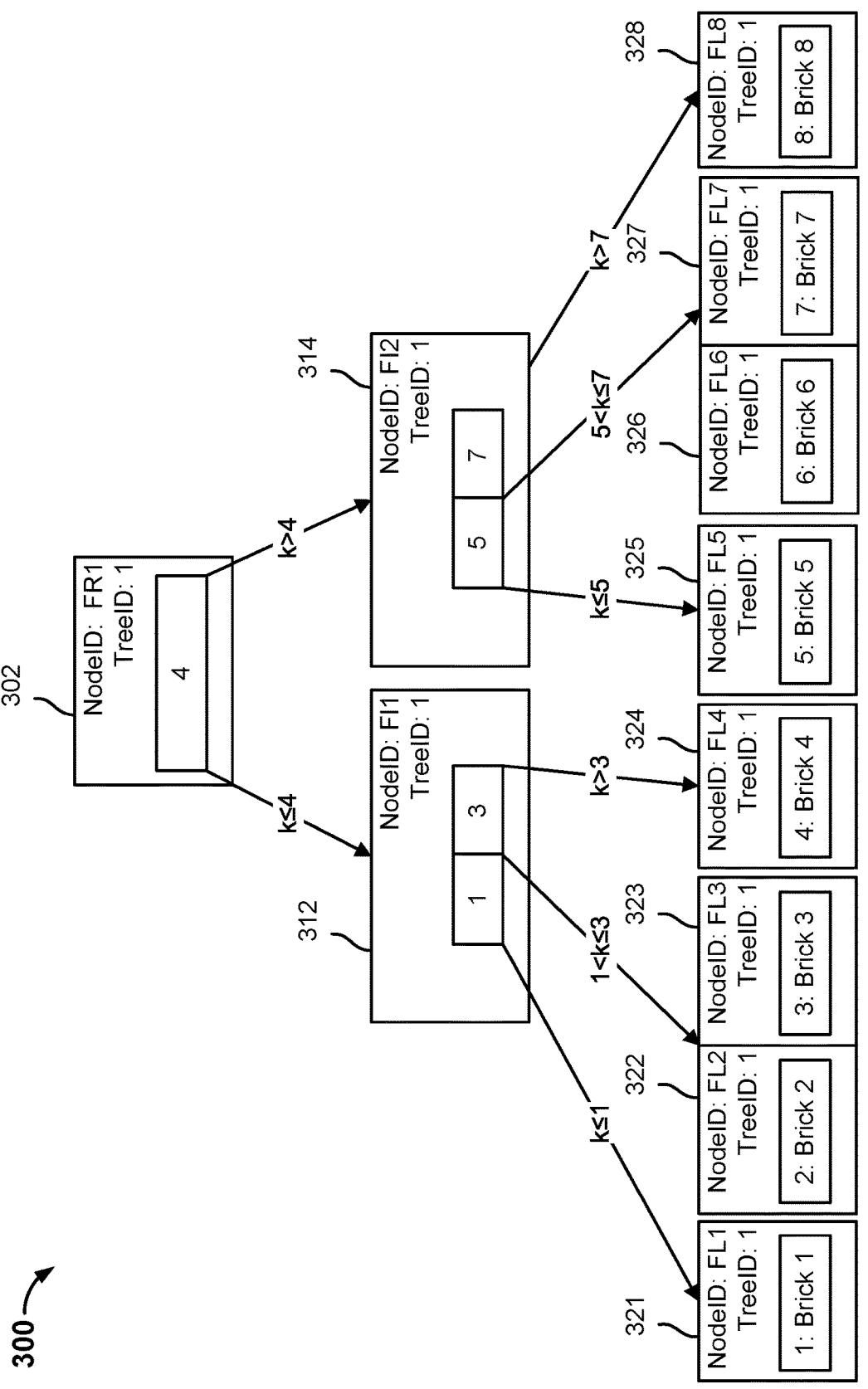
FIG. 3A is a block diagram illustrating an embodiment of a tree data structure.

FIG. 3A is a block diagram illustrating an embodiment of a tree data structure. In some embodiments, tree data structure 300 may be created by a storage system, such as storage system 112. Tree data structure 300 may be used to store the metadata associated with a workload metadata structure, a workload file metadata structure, or a file metadata structure. In the example shown, tree data structure 300 corresponds to a content file and stores the file metadata associated with the content file. The file metadata associated with a content file may be stored by a storage system separate from the contents of the file, that is, the tree data structure storing the file metadata associated with a content file is stored separately from the contents of the content file. For example, the contents of the file may be stored on a hard disk drive, while tree data structure 300 that holds the file metadata may be stored in storage with faster access times, such as a solid state drive (SSD) of a storage node.

A leaf node of a snapshot tree associated with file system data, such as a leaf node of tree data structures 200, 250, 255, may include a pointer to a tree data structure that stores metadata corresponding to a content file, such as tree data structure 300. A tree data structure corresponding to a content file and storing the file metadata associated with the content file is a snapshot tree, but is used to organize the data chunks associated with a content file (e.g., data components) that are stored on the storage system. A file metadata structure may be referred to as a file metadata tree.

A tree data structure corresponding to a content file at a particular point in time (e.g., a particular version) may be comprised of a root node, one or more levels of one or more intermediate nodes, and one or more leaf nodes. In some embodiments, a tree data structure corresponding to a content file is comprised of a root node and one or more leaf nodes without any intermediate nodes. Tree data structure 300 may be a snapshot of a content file at a particular point in time t, for example at time to. Tree data structure 300 may correspond to a full backup of a content file.

In the example shown, tree data structure 300 includes file root node 302, file intermediate nodes 312, 314, and file leaf nodes 321, 322, 323, 324, 325, 326, 327, 328. Similar to the snapshot trees described above, each node includes a "NodeID" that identifies the node and a "TreeID" that identifies a view with which the node is associated (e.g., a version of the content file). Root node 302 includes pointers to intermediate nodes 312, 314. Root node 302 includes a NodeID of "FR1" and a TreeID of "1."

In the example shown, intermediate node 312 includes respective pointers to leaf nodes 321, 322, 323, 324. Intermediate node 312 includes a NodeID of "FI1" and a TreeID of "1." Intermediate node 312 includes a first node key and a second node key. The data key k for leaf node 321 is a value that is less than or equal to the first node key. The data key for leaf nodes 322, 323 is a value that is greater than the first node key and less than or equal to the second node key. The data key for leaf node 324 is a value that is greater than the second node key. The pointer to leaf node 321 indicates that traversing tree data structure 300 from intermediate node 312 to leaf node 321 will lead to the node with a data key of "1." The pointer to leaf node 322 indicates that traversing tree data structure 300 from intermediate node 312 to leaf node 322 will lead to the node with a data key of "2." The pointer to leaf node 323 indicates that traversing tree data structure 300 from intermediate node 312 to leaf node 323 will lead to the node with a data key of "3." The pointer to leaf node 324 indicates that traversing tree data structure 300 from intermediate node 312 to leaf node 324 will lead to the node with a data key of "4."

In the example shown, intermediate node 314 includes respective pointers to leaf nodes 325, 326, 327, 328. Intermediate node 314 includes a NodeID of "FI2" and a TreeID of "1." Intermediate node 314 includes a first node key and a second node key.

The data key k for leaf node 325 is a value that is less than or equal to the first node key. The data key for leaf nodes 326, 327 is a value that is greater than the first node key and less than or equal to the second node key. The data key for leaf node 328 is a value that is greater than the second node key. The pointer to leaf node 325 indicates that traversing tree data structure 300 from intermediate node 314 to leaf node 325 will lead to the node with a data key of "5." The pointer to leaf node 326 indicates that traversing tree data structure 300 from intermediate node 314 to leaf node 326 will lead to the node with a data key of "6." The pointer to leaf node 327 indicates that traversing tree data structure 300 from intermediate node 314 to leaf node 327 will lead to the node with a data key of "7." The pointer to leaf node 328 indicates that traversing tree data structure 300 from intermediate node 314 to leaf node 328 will lead to the node with a data key of "8."

Leaf node 321 includes a data key-value pair of "1: Brick 1." "Brick 1" is a brick identifier that identifies the data brick associated with one or more data chunks of a content file corresponding to tree data structure 300. Leaf node 321 includes NodeID of "FL1" and a TreeID of "1."

Leaf node 322 includes a data key-value pair of "2: Brick 2." "Brick 2" is a brick identifier that identifies the data brick associated with one or more data chunks of a content file corresponding to tree data structure 300. Leaf node 322 includes NodeID of "FL2" and a TreeID of "1." In this example, both leaf nodes 322, 323 have a key value that is less than or equal to 3 and greater than 1. A file system manager may traverse to leaf node 322 or leaf node 323 based on the corresponding key associated with leaf node 322 and leaf node 323. For example, the file system manager may receive a request to return the value associated with a data key "2." In response to the request, the file system manager may traverse tree data structure 300 to leaf node 322. A file system manager may receive a request to return the value associated with a data key "3." In response to the request, the file system manager may traverse tree data structure 300 to leaf node 323.

Leaf node 323 includes a data key-value pair of "3: Brick 3." "Brick 3" is a brick identifier that identifies the data brick associated with one or more data chunks of a content file corresponding to tree data structure 300. Leaf node 323 includes NodeID of "FL3" and a TreeID of "1."

Leaf node 324 includes a data key-value pair of "4: Brick 4." "Brick 4" is a brick identifier that identifies the data brick associated with one or more data chunks of a content file corresponding to tree data structure 300. Leaf node 324 includes NodeID of "FL4" and a TreeID of "1."

Leaf node 325 includes a data key-value pair of "5: Brick 5." "Brick 5" is a brick identifier that identifies the data brick associated with one or more data chunks of a content file corresponding to tree data structure 300. Leaf node 325 includes NodeID of "FL5" and a TreeID of "1."

Leaf node 326 includes a data key-value pair of "6: Brick 6." "Brick 6" is a brick identifier that identifies the data brick associated with one or more data chunks of a content file corresponding to tree data structure 300. Leaf node 326 includes NodeID of "FL6" and a TreeID of "1." In this example, both leaf nodes 326, 327 have a key value that is less than or equal to 7 and greater than 5. A file system manager may traverse tree data structure 300 to leaf node 326 or leaf node 327 based on the corresponding key associated with leaf node 326 and leaf node 327. For example, the file system manager may receive a request to return the value associated with a data key "6." In response to the request, the file system manager may traverse tree data structure 300 to leaf node 326. The file system manager may receive a request to return the value associated with a data key "7." In response to the request, the file system manager may traverse tree data structure 300 to leaf node 327.

Leaf node 327 includes a data key-value pair of "7: Brick 7." "Brick 7" is a brick identifier that identifies the data brick associated with one or more data chunks of a content file corresponding to tree data structure 300. Leaf node 327 includes NodeID of "FL7" and a TreeID of "1."

Leaf node 328 includes a data key-value pair of "8: Brick 8." "Brick 8" is a brick identifier that identifies the data brick associated with one or more data chunks of a content file corresponding to tree data structure 300. Leaf node 328 includes NodeID of "FL8" and a TreeID of "1."

A content file may be comprised of a plurality of data chunks. A brick may be associated with one or more data chunks. In the example shown, leaf nodes 321, 322, 323, 324, 325, 326, 327, 328 each store a corresponding brick identifier. A metadata store, such as metadata store 114, may include one or more data structures that associate a brick identifier with one or more corresponding chunk identifiers and a corresponding location (physical location) of the one or more data chunks associated with the one or more corresponding chunk identifiers. For example, a metadata store may store a first data structure (e.g., chunk metadata table) that is configured to associate brick identifiers with chunk identifiers and chunk file identifiers. The metadata store may store a second data structure (e.g., chunk file metadata table) that associates a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Figure 3B:
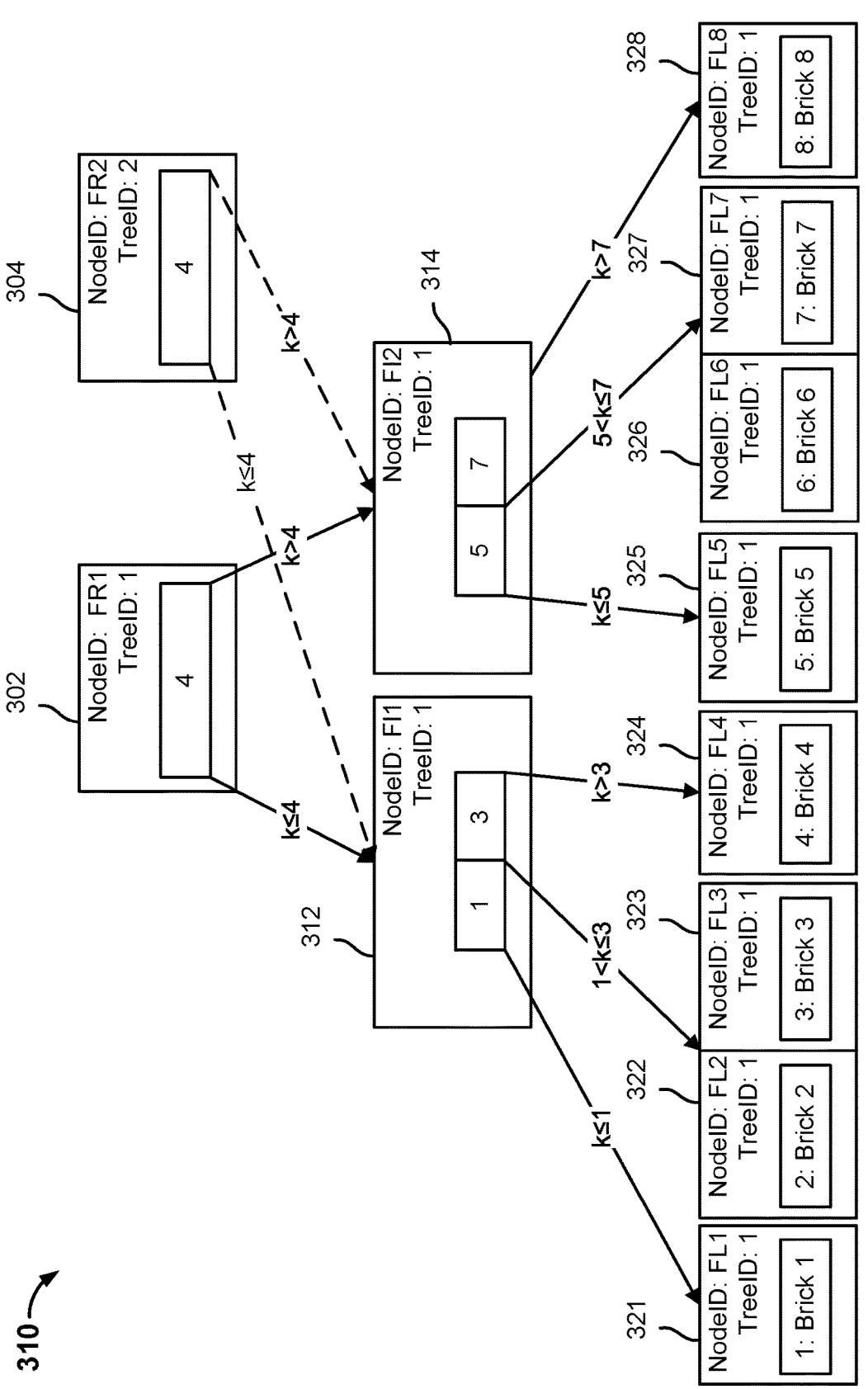
FIG. 3B is a block diagram illustrating an embodiment of a cloned metadata structure.

FIG. 3B is a block diagram illustrating an embodiment of a cloned metadata structure. A metadata structure may be cloned when a subsequent version of a workload, a workload file, a content file is stored on a storage system. In some embodiments, tree data structure 310 may be created by a storage system, such as storage system 112. In the example shown, tree data structure 310 corresponds to a content file that is a snapshot tree, but stores file metadata associated with the content file. The tree data structure corresponding to a content file can be used to capture different versions of a workload, a workload file, or a content file at different moments in time. In some embodiments, the tree data structure allows a chain of metadata structures corresponding to different versions of a workload, a workload file, or a content file to be linked together by allowing a node of a later version of a metadata structure to reference a node of a previous version of a metadata structure. The metadata structure corresponding to a subsequent version of a workload, a workload file, or a content file may be generated in part by cloning the metadata structure corresponding to a previous version of a workload, a workload file, or a content file.

A root node or an intermediate node of a version of a metadata structure may reference an intermediate node or a leaf node of a previous version of a metadata structure. Similar to the snapshot tree, the metadata structure allows different versions of a workload, a workload file, or a content file to share nodes and allows changes to a content file to be tracked. When a backup snapshot is received, a root node of the metadata structure may be linked to one or more intermediate nodes associated with a previous metadata structure. This may occur when data associated with a workload, a workload file, or a content file is included in both backup snapshots.

In the example shown, tree data structure 310 includes a first metadata structure comprising root node 302, intermediate nodes 312, 314, and leaf nodes 321, 322, 323, 324, 325, 326, 327, 328. Tree data structure 310 also includes a second metadata structure that may be a snapshot of file data at a particular point in time, for example at time $t_1$. The second metadata structure is comprised of root node 304, intermediate nodes 312, 314, and leaf nodes 321, 322, 323, 324, 325, 326, 327, 328. To create a snapshot of the file data at time $t_1$, a new root node is created by cloning the previous root node. The cloned root node includes the same set of pointers as the previous root node, but includes a different NodeID and a different TreeID. In the example shown, root node 304 includes a set of pointers to intermediate nodes 312, 314, which are intermediate nodes associated with a previous snapshot. The TreeID is the view identifier associated with a view of the metadata structure at a particular moment in time. The TreeID of a root node indicates a view with which the root node is associated (e.g., content file version). For example, root node 302 with a TreeID of "1" is associated with a first backup snapshot and root node 304 with a TreeID of "2" is associated with a second backup snapshot.

In the example shown, root node 304 is a clone (i.e., a copy) of root node 302. Similar to root node 302, root node 304 includes the same pointers as root node 302. Root node 304 includes a first set of pointers to intermediate node 312. The first set of pointers associated with a data key (e.g., "1," "2," "3," or "4") less than or equal to the node key indicates that traversing a metadata structure included in tree data structure 310 from root node 304 to intermediate node 312 leads to a leaf node with a data key of "1," "2," "3," or "4." Root node 304 includes a second set of pointers to intermediate node 314. The second set of pointers associated with a data key greater than the node key indicates that traversing a metadata structure included in tree data structure 310 from root node 304 to intermediate node 314 leads to a leaf node with a data key of "5," "6," "7," or "8." Root node 304 includes a NodeID of "FR2" and a TreeID of "2."

Figure 3C:
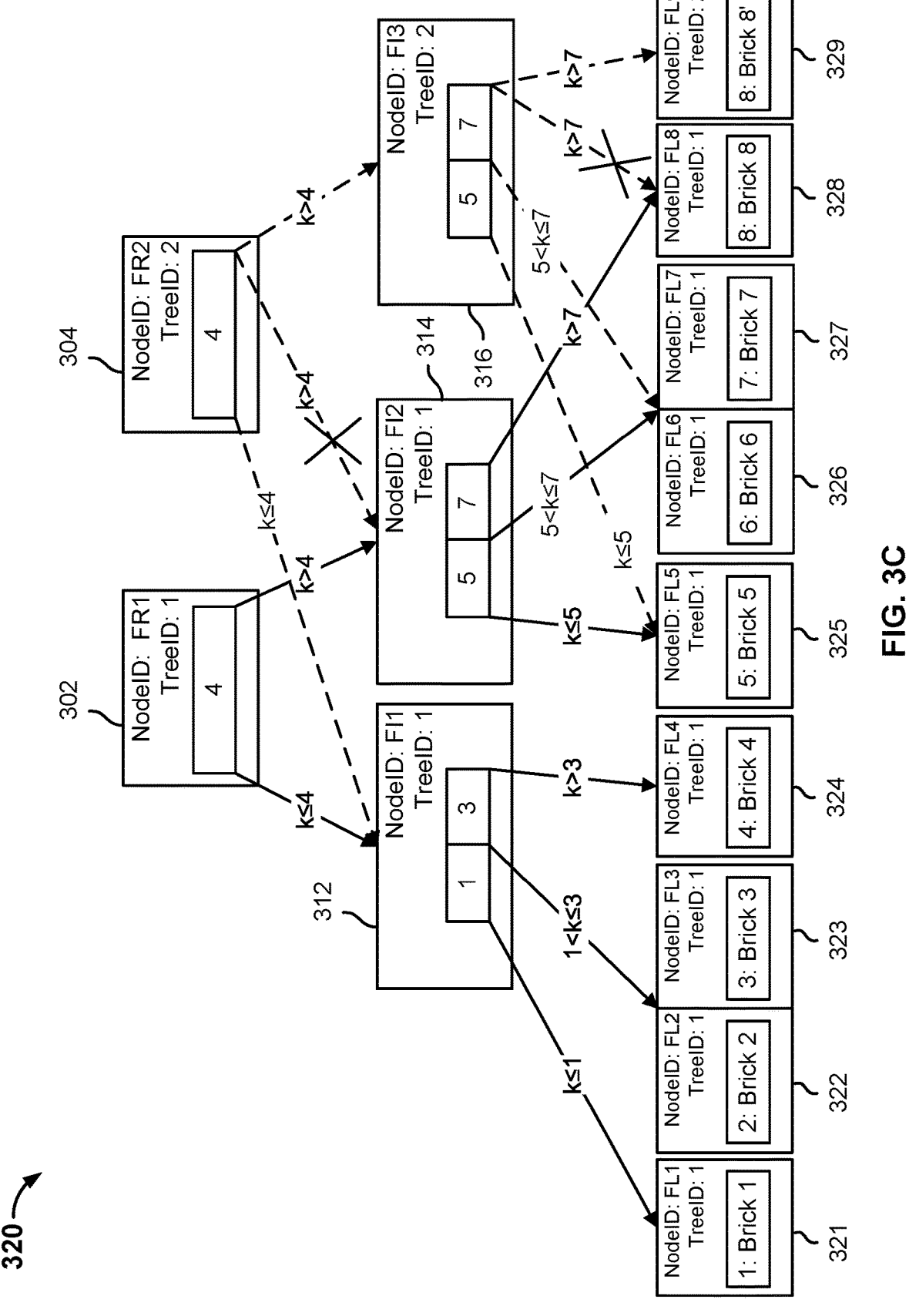
FIG. 3C is a block diagram illustrating an embodiment of modifying a cloned metadata structure.

FIG. 3C is a block diagram illustrating an embodiment of modifying a cloned metadata structure. Tree data structure 320 is comprised of a first metadata structure that includes root node 302 and a second metadata structure that includes root node 304. In the example shown, tree data structure 320 may be modified by a file system manager, such as file system manager 117.

In some embodiments, the file data associated with a content file may be modified such that one of the data chunks is replaced by another data chunk. When a data chunk of file data associated with a previous backup snapshot is replaced with a new data chunk, the data brick associated with the new data chunk may be different. A leaf node of a metadata structure stores a brick identifier of a data brick that is associated with a data chunk. To represent this modification to the file data, a corresponding modification is made to a current view of a metadata structure. The current view of the metadata structure is modified because the previous metadata structure is a snapshot view and can no longer be modified. The data chunk of the file data that was replaced has a corresponding leaf node in the previous metadata structure. A new leaf node in the current view of the metadata structure is created, as described herein, that corresponds to the new data chunk. The new leaf node includes an identifier associated with the current view. The new leaf node may also store the chunk identifier associated with the modified data chunk.

In the example shown, a data chunk associated with "Brick 8" has been modified. The data chunk associated with "Brick 8" has been replaced with a data chunk associated with "Brick 8'." At $t_1$, the file system manager starts at root node 304 because that is the root node associated with the metadata structure at time $t_1$. The value "Brick 8" is associated with the data key "8." The file system manager traverses tree data structure 320 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a copy of a node and includes the same pointers as the copied node, but includes a different NodeID and TreeID. For example, to reach a leaf node with a data key of "8," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 320 from intermediate node 316 to leaf node 328, determines that the TreeID of leaf node 328 does not match the TreeID of root node 304, and creates a copy of leaf node 328. Leaf node 329 is a copy of leaf node 328, but stores the brick identifier "Brick 8'" and includes the same TreeID as root node 304. The file system manager updates a pointer of intermediate node 316 to point to leaf node 329 instead of pointing to leaf node 328.

Figure 3D:
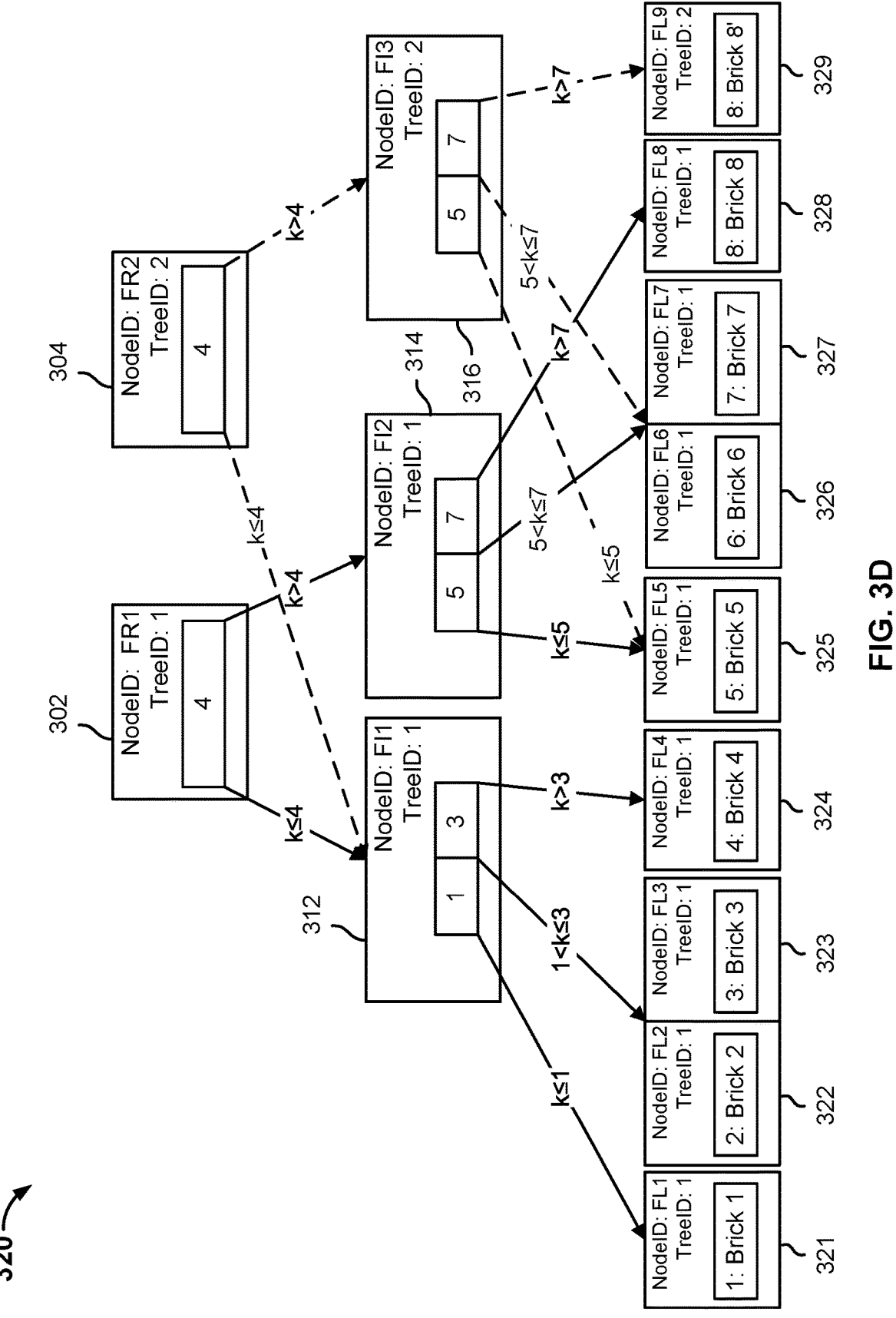
FIG. 3D is a block diagram illustrating an embodiment of a modified metadata structure.

FIG. 3D is a block diagram illustrating an embodiment of a modified metadata structure. The tree data structure 320 shown in FIG. 3D illustrates a result of the modifications made to tree data structure 320 as described with respect to FIG. 3C.

Figure 4A:
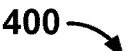
FIG. 4A is a diagram illustrating a data structure in accordance with some embodiments.

FIG. 4A is a diagram illustrating a data structure in accordance with some embodiments. Data structure 400 may be stored by a storage system, such as storage system 112, in a metadata store, such as metadata store 114. Data structure 400 may correspond to a chunk metadata table. In the example shown, data structure 400 stores the information associated with tree data structure 320. Data structure 400 stores information about the nodes included in tree data structure 320. For example, data structure 400 stores information about a node, such as "TreeID," "NodeID," "ChildrenID," "Ref Count," "Value," "ChunkID," and "Chunk FileID."

The "TreeID" value identifies a view of data to which the node is originally associated. For example, a view of data may be generated by a storage system. A "TreeID" of "1" indicates that a node was generated when the storage system generated a view of data associated with a "TreeID" of "1." The "NodeID" value identifies a name of a node. The "ChildrenID" value identifies the one or more children nodes to which the node points. The "Ref Count" value is a reference count that indicates a number of nodes that point to the node. The "Value" value is a value (e.g., brick identifier) stored by a leaf node. The "ChunkID" value is a chunk identifier associated with a brick identifier. The "Chunk FileID" value is a chunk file identifier that is associated with a chunk identifier.

A storage system may store a version of data structure 400 for each view generated by the storage system. In some embodiments, data structure 400 stores information for all of the views generated by the storage system. In some embodiments, data structure 400 stores information for all of the views of data associated with a data group generated by the storage system. The storage system may store a version of data structure 400 for each data group associated with the storage system.

A storage system may traverse data structure 400 to determine which data chunks are associated with a view of data. The storage system may traverse all the data structures corresponding to views of data associated with a storage domain to determine which chunks are associated with which views of data associated with the storage domain. The storage system may then use this information to determine for each view associated with the storage domain, the plurality of data chunks associated with a view.

In the example shown, the storage system may traverse data structure 400 to determine that data chunks having chunk identifiers "SHA-la," "SHA-1$_b$," "SHA-1$_c$," "SHA-1$_d$," "SHA-1$_e$," "SHA-1$_f$," and "SHA-1$_g$" are associated with views having a "TreeID" of "1" and "2." The storage system may traverse data structure 400 to determine that the data chunk with the chunk identifier "SHA-1$_h$" is associated with view having a "TreeID" of "1." The storage system may traverse data structure 400 to determine that the data chunk with the chunk identifier "SHA-1$_i$" is associated with view having a "TreeID" of "2."

In the example shown, the storage system may traverse data structure 400 to determine that a view with a "TreeID" of "1" is associated with data chunks with the chunk identifiers "SHA-1$_a$," "SHA-1$_b$," "SHA-1$_c$," "SHA-1$_d$," "SHA-1$_e$," "SHA-1$_f$," "SHA-1$_g$," and "SHA-1$_h$." The storage system may traverse data structure 400 to determine that a view with a "TreeID" of "2" is associated with data chunks with the chunk identifiers "SHA-1$_a$," "SHA-1$_b$," "SHA-1$_c$," "SHA-1$_d$," "SHA-1$_e$," "SHA-1$_f$," "SHA-1$_g$," and "SHA-1$_i$."

In the event the view having a "TreeID" of "1" is deleted, the storage system would reclaim the disk space associated with the data chunk with the chunk identifier "SHA-1$_h$" because the other data chunks associated with the "TreeID" of "1" are deduplicated. In the event the view having a "TreeID" of "2" is deleted, the storage system would reclaim the disk space associated with the data chunk with the chunk identifier "SHA-1$_i$" because the other data chunks associated with the "TreeID" of "2" are deduplicated. In the event the view having a "TreeID" of "1" and "2" is deleted, the storage system would reclaim the disk space associated with the data chunks with the chunk identifiers "SHA-1$_a$", "SHA-1$_b$", "SHA-1$_c$", "SHA-1$_d$", "SHA-1$_e$", "SHA-1$_f$", "SHA-1$_g$", "SHA-1$_h$", and "SHA-1$_i$" because in this example, those data chunks are not associated with other views.

FIG. 4B is a diagram illustrating a data structure in accordance with some embodiments. Data structure 450 may correspond to a chunk file metadata table. Data structure 450 may be stored in a metadata store, such as metadata store 114. In the example shown, data structure 450 is configured to associate a chunk file identifier with a chunk identifier, a chunk file offset, a storage node, and a primary owner.

A chunk file is comprised of a plurality of data chunks. Data structure 450 may indicate the plurality of data chunks associated with a chunk file. Data structure 450 may also indicate corresponding locations of the data chunks within the chunk file. For example, data structure 450 indicates that a chunk file having a chunk file identifier of "Chunk File 1" is comprised of at least a first data chunk having a chunk identifier of "SHA-1$_a$," a second data chunk having a chunk identifier of "SHA-1$_b$," a third data chunk having a chunk identifier of "SHA-1$_c$," and a fourth data chunk having a chunk identifier of "SHA-1$_d$." The first data chunk has a chunk file offset of "0-256 kb," the second data chunk has a chunk file offset of "256 kb-512 kb," the third data chunk has a chunk file offset of "512 kb-768 kb," and the fourth data chunk has a chunk file offset of "768 kb-1024 kb."

Data structure 450 indicates that a chunk file having a chunk file identifier of "Chunk File 2" is comprised of at least a first data chunk having a chunk identifier of "SHA-1$_e$," a second data chunk having a chunk identifier of "SHA-1$_f$," a third data chunk having a chunk identifier of "SHA-1$_g$," and a fourth data chunk having a chunk identifier of "SHA-1$_h$." The first data chunk has a chunk file offset of "0-256 kb," the second data chunk has a chunk file offset of "256 kb-512 kb," the third data chunk has a chunk file offset of "512 kb-768 kb," and the fourth data chunk has a chunk file offset of "768 kb-1024 kb."

Data structure 450 indicates that a chunk file having a chunk file identifier of "Chunk File 3" is comprised of at least a first data chunk having a chunk identifier of "SHA-1$_i$." The first data chunk has a chunk file offset of "0-256 kb."

A storage system comprised of a plurality of storage nodes may store redundant copies of a chunk file across the nodes. This may ensure access to the chunk file in the event a storage node of the storage system goes offline. In the example shown, a chunk file having a chunk file identifier of "Chunk File 1" is stored on storage node 1 and storage node 3, a chunk file having a chunk file identifier of "Chunk File 2" is stored on storage node 2 and storage node 4, and a chunk file having a chunk file identifier of "Chunk File 3" is stored on storage node 2 and storage node 3.

A chunk file may be associated with a primary owner. The primary owner may correspond to the original metadata structure that includes references to the data chunks included in the chunk file. For example, a primary system may perform a first backup snapshot that includes a first content file and send the data associated with the first content file to a storage system. The storage system may generate and store the data associated with the first content file in one or more chunk files. The storage system may generate a first metadata structure corresponding to the first content file. In other embodiments, the primary owner corresponds to the original content file that is associated with the chunk file.

The primary system may perform a second backup snapshot that includes a second content file and send the data associated with the second content file to the storage system. Some of the data associated with the second content file may already be stored on the storage system. Instead of generating a second chunk file for the duplicate data, the storage system may generate a second metadata structure corresponding to the second content file and the second metadata structure may include one or more references to the one or more chunk files associated with the first content file. The second file metadata structure may be considered to be a secondary owner. In the example shown, the metadata structure corresponding to "File 1" is the primary owner of chunk files 1, 2 and the metadata structure corresponding to "File 2" is the primary owner of chunk file 3.

A chunk file metadata table may associate portions of a chunk file with one or more secondary owners. For example, file 2 is a secondary owner of chunk file 1 having a file offset of 0-1024 kb and file 2 is a secondary owner of chunk file 2 having a file offset of 0-768 kb.

FIG. 5 is a flow chart illustrating a process for managing a storage capacity of a storage system in accordance with some embodiments. In the example shown, process 500 may be implemented by a storage system, such as storage system 112.

At 502, a plurality of different views of data associated with a storage domain stored on a deduplicated storage are traversed to determine data chunks belonging to each view of the plurality of different views of data associated with the storage domain. A storage system may back up data from a primary system associated with a data group and generate a view corresponding to the backed up data each time the primary system backs up data to the storage system. The view corresponding to the backed up data may include a snapshot tree and one or more metadata structures. The storage system may deduplicate within a storage domain the backed up data when possible to save storage space. In some embodiments, the plurality of different views of data associated with a storage domain correspond to a plurality of files that are associated with the storage domain.

Data associated with a data group associated with the storage domain may be generated on or by the storage system (e.g., a system generated file, a user generated file, an application generated file, etc.). The storage system may generate a view corresponding to the data associated with the data group. The view corresponding to the data associated with the data group may include a snapshot tree and one or more metadata trees. The storage system may deduplicate within the storage domain the data associated with a data group generated on or by the storage system when possible to save storage space.

The plurality of views of data associated with the storage domain stored on the storage system are traversed to determine the plurality of data chunks stored by the storage system. Traversing the plurality of views of data associated with the storage domain includes traversing one or more tree data structures. Some of the data chunks are associated with a single view (e.g., a data chunk is not deduplicated within a storage domain). Some of the data chunks are associated with a plurality of views (e.g., a data chunk is deduplicated within a storage domain). The storage system determines, for each data chunk, the one or more views of data associated with the storage domain to which a data chunk belongs.

In some embodiments, the storage system separately deduplicates data associated with a data group. For example, a storage system may store data associated with a first data group associated with a first storage domain and data associated with a second data group associated with a second storage domain. The storage system may deduplicate the data associated with the first data group and deduplicate the data associated with the second data group, but the deduplicated data is not shared between the first and second storage domains. The storage system may traverse a plurality of different views of data of the first data group associated with a first storage domain without traversing a plurality of different views of data of the second data group associated with a second storage domain to determine a metric associated with disk space utilization for the first data group.

In some embodiments, the storage system jointly deduplicates data associated with the plurality of data groups. For example, the storage system may store data associated with a first data group associated with a first storage domain and data associated with a second data group associated with the first storage domain. The storage system may deduplicate the data associated with the first data group and deduplicate the data associated with the second data group, and the deduplicated data is shared between the first and second data groups because they are both part of the first storage domain.

The storage system may traverse a plurality of different views of data of the first data group associated with the first storage domain and traverse a plurality of different views of data of the second data group associated with the first storage domain to determine a metric associated with disk space utilization for the first data group.

At 504, a request for a metric associated with disk space utilization of a group of one or more selected views of data associated with the storage domain included in the plurality of different views of data associated with the storage domain that are stored on the deduplicated storage is received. The metric associated with disk space utilization may be an amount of provisioned storage capacity being used by the one or more selected views of the group, an amount of provisioned storage capacity being used by the one or more selected views of the group that is deduplicated, an amount of storage capacity (attributed or actual physical) being used by the one or more selected views of the group, a rate at which the data associated with the group is using the storage capacity provisioned to the data group by an entity associated with the storage space, an expected amount of time before the data associated with the group uses the complete amount of storage capacity provisioned to the data group by an entity associated with the storage space, an amount of storage capacity reclaimed by deleting some or all of the one or more selected views of the group, etc. A user associated with the data group may select the one or more views of data associated with a storage domain to be included in the group based on one or more factors, such as a time range, a timestamp, a file type, file size, the size of data associated with a view, a protection job type associated with the view, etc.

In some embodiments, the one or more selected views are associated with a first data group that is associated with a first storage domain and the other views of the plurality of different views stored on a storage system are also associated with the first data group. In some embodiments, the one or more selected views are associated with a first data group that is associated with a first storage domain and the other views of the plurality of different views stored on the storage system are associated with the first data group that is associated with the first storage domain and one or more other data groups that are associated with the first storage domain. In some embodiments, the one or more selected views are associated with a first data group that is associated with a first storage domain and the other views of the plurality of different views stored on the storage system are associated with one or more other data groups that are associated with the first storage domain.

In some embodiments, the data group is a tenant. The tenant may be comprised of a plurality of departments. Each of the plurality of departments may be associated with one or more corresponding views. The storage system may perform a plurality of protection job types for each department. Each instance of a protection job may have a corresponding view. The storage system may identify the one or more file types protected by a protection job. A user associated with the tenant may select one or more views to be included in the group associated with the tenant by selecting a combination of one or more departments associated with the tenant, one or more protection job types associated with each of the one or more departments, and/or one or more file types to be included in the group associated with the tenant. The user associated with the tenant may also select the one or more views to be included in the group associated with the tenant based on a time range (e.g., 01/01/2019-01/01/

2020), a size of the data associated with a view (e.g., views of data having a size of at least 100 GB), etc.

For example, the tenant may be comprised of an engineering department, a sales department, a marketing department, a human resources department, etc. The data associated with each department may be backed up from a primary system of the tenant to the storage system. The storage system may store a view corresponding to each time data is backed up from the primary system to the storage system. The storage system may perform one or more protection jobs for the tenant. The protection job types may include backing up data associated with a department, replicating data associated with the department, migrating data associated with the department, etc. The storage system may generate and store a new view of data each time a protection job is performed. Different types of files, such as a virtual machine, a container, a database, a video file, an audio file, a text file, an application, etc., may be stored on the storage system. The metadata associated with a file type is stored in a view and may be used to identify the one or more types of files to which a view of data is associated. In some embodiments, a user associated with the data group associated with a tenant selects all the views of data associated with the data group to be included in the group within a particular time range. In some embodiments, the user associated with the data group selects all the views of data associated with a department within a particular time range. In some embodiments, the user associated with the data group selects views of data associated with a particular protection job type within a particular time range. In some embodiments, the user associated with the data group selects the views associated a file type having a threshold size. In some embodiments, the user associated with the data group selects the views of data associated with a particular department (e.g., marketing), a particular protection job (e.g., backups), and a particular file type (e.g., video files) that is included in the particular protection job. This level of granularity provides the user associated with the data group with the ability to determine which department, protection job type, and/or file type is using a substantial amount of storage capacity provisioned by the entity associated with the storage space.

At 506, one or more data chunks belonging to the one or more selected views of data associated with the storage domain of the group but not other views of the plurality of different views of data associated with the storage domain that are stored on the deduplicated storage are identified. For each view included in the one or more selected views of data associated with the storage domain of the group, the storage system determines if a data chunk included in the one or more selected views of data associated with the storage domain of the group is included in one or more views of data associated with the storage domain that are not included in the group.

In some embodiments, a data chunk is not deduplicated and belongs to one of the selected views of data associated with the storage domain of the group. In some embodiments, a data chunk is deduplicated, but only belongs to a plurality of selected views of data associated with the storage domain of the group. In some embodiments, a data chunk is deduplicated, but belongs to at least one of the plurality of selected views of the group and one or more views of data associated with the storage domain not included in the group. The storage system identifies the one or more data chunks that are not deduplicated and belong to one of the selected views of data associated with the storage domain of the group, and the one or more data chunks that are deduplicated, but only belong to a plurality of selected views of data associated with the storage domain of the group.

At 508, an incremental disk space utilization of the group is determined. The incremental disk space utilization of the group corresponds to a total size of the one or more identified data chunks. Each of the one or more identified data chunks has a corresponding size. The total size of the one or more identified data chunks is the sum of the corresponding size for each of the one or more identified data chunks. The incremental disk space utilization of the group corresponds to an amount of storage capacity (attributed or actual physical) that would be reclaimed in the event the one or more selected views of the group are deleted from the storage system.

In the event the data group is a tenant, the group may be comprised of one or more departments, one or more protection job types, and/or one or more file types. The incremental disk space utilization of the group may be broken down for each of the one or more departments, each of the one or more protection job types, and/or each of the one or more file types. The incremental disk space utilization of the group may be broken down for a selected sub-group of the group. The selected sub-group may be any combination of department, protection job type, and/or file type.

At 510, the metric based on the determined incremental disk space utilization of the group is provided. The storage system may provide via a data group interface the metric associated with disk space utilization based on the determined incremental disk space utilization of the group. For example, the storage system may provide an amount of storage space used by the data associated with the one or more selected views of data associated with the storage domain, an amount of storage space used by the data associated with the one or more selected views of data associated with the storage domain that is deduplicated, an amount of storage capacity (attributed or actual physical) being used by the one or more selected views of data associated with the storage domain of the group, a rate at which the data associated with the group is using the storage space provisioned to the data group by an entity associated with the storage space, an expected amount of time before the data associated with the group uses the complete amount of storage space provisioned to the data group by an entity associated with the storage space, etc.

At 512, the metric associated with disk space utilization is used to manage the deduplicated storage. For example, a user associated with the data group may decide whether to delete one or more of the selected views of data associated with the storage domain of the group based on based on the amount of storage space reclaimed by deleting the one or more of the selected views of data associated with the storage domain of the group. A user associated with the data group may select to delete some or all of the data associated with the selected views based on file type. A user associated with the data group may select to delete some or all of the data associated with the selected views based on department. A user associated with the data group may select to delete some or all of the data associated with the selected views based on protection job type. In response to receiving a command to delete, the storage system is configured to delete the data associated with some or all of the data associated with the selected views of data associated with the storage domain of the group.

The user associated with the data group may modify one or more policies associated with the storage system. For example, the user associated with the data group may modify a storage policy, associated with a view, such as a retention policy, such that the total number of days a view of data stored by the storage system is reduced. This may increase the available storage capacity for the data group. The user associated with the data group may modify a protection policy, such as a backup snapshot policy, such that a frequency at which backups are performed is reduced. This may increase the available storage capacity for the data group.

FIG. 6 is a flow chart illustrating a process for associating data chunks with views of data in accordance with some embodiments. In the example shown, process 600 may be implemented by a storage system, such as storage system 112. Process 600 may be used to perform some or all of steps 502 and 504 of process 500.

At 602, views of data associated with a storage domain stored by a storage system are determined. The storage system may store data associated with one or more data groups. The storage system is configured to generate one or more corresponding views of data for the data associated with each of the data groups. Each view may correspond to a particular moment in time for the data associated with the data group. For example, a view may be generated each time data associated with the data group is backed up from the primary system to the storage system. A view may be generated each time a different version of data associated with a data group that is generated on or by the storage system is generated. A view may be generated when a data group desires to use backup data for test/development purposes. A view may correspond to a file.

At 604, each of the determined views is associated with one or more data groups. There may be n combinations of data groups based on the one or more protection job types associated with a data group and/or one or more file types associated with a data group. The views of data associated with each of the data groups may be determined.

In some embodiments, the data group corresponds to a tenant. The tenant may be comprised of a plurality of departments. For example, the tenant may be comprised of an engineering department, a sales department, a marketing department, a human resources department, etc. Each of the departments may be considered to be a sub data group. The storage system may perform a plurality of protection job types for each department. For example, the protection job types may include backing up data associated with a department, replicating data associated with the department, migrating data associated with the department, etc. Each type of protection job may be considered to be a sub data group. Each instance of a protection job may have a corresponding view. The storage system may identify a type of file protected by a protection job. For example, a type of file protected by a protection job may include a virtual machine, a container, a database, a video file, an audio file, a text file, an application, etc. Each type of file may be considered to be a sub data group. The metadata associated with a file type may be stored in a view of data. There may be n combinations of data groups or sub data groups based on the one or more departments associated with a tenant, one or more protection job types associated with a tenant, and/or one or more file types associated with a tenant. The views of data associated with each of the data groups and/or sub data groups may be determined.

For example, a first view $V_1$ may be associated with a first data group $G_1$, a second data group $G_2$, and a third data group $G_3$. A second view $V_2$ may be associated with the second data group $G_2$ and the third data group $G_3$. A third view $V_3$ may be associated with the first data group $G_1$ and the third data group $G_3$.

At 606, the views belonging to each of the data groups is determined. For example, the views belonging to the first data group $G_1$ include the first view $V_1$ and the third view $V_3$. The views belonging to the second data group $G_2$ include the first view $V_1$ and the second view $V_2$. The views belonging to the third data group $G_3$ include the first view $V_1$, the second view $V_2$, and the third view $V_3$.

At 608, data chunks belonging to each of the determined views are determined.

The storage system may traverse a plurality of views of data associated with a storage domain that are stored by the storage system to determine data chunks belonging to each view of the plurality of views of data associated with the storage domain. In some embodiments, a data chunk belongs to a single view, i.e., the data chunk is not deduplicated within the storage domain. In some embodiments, a data chunk belongs to a plurality of views, i.e., the data chunk is deduplicated within the storage domain. For example, a first data chunk $C_1$ may be belong to views $V_1$, $V_2$, $V_3$, and $V_4$, a second data chunk $C_2$ may belong to views $V_1$, $V_3$, and $V_4$, and a third data chunk $C_3$ may belong to views $V_2$ and $V_4$.

Figure 7:
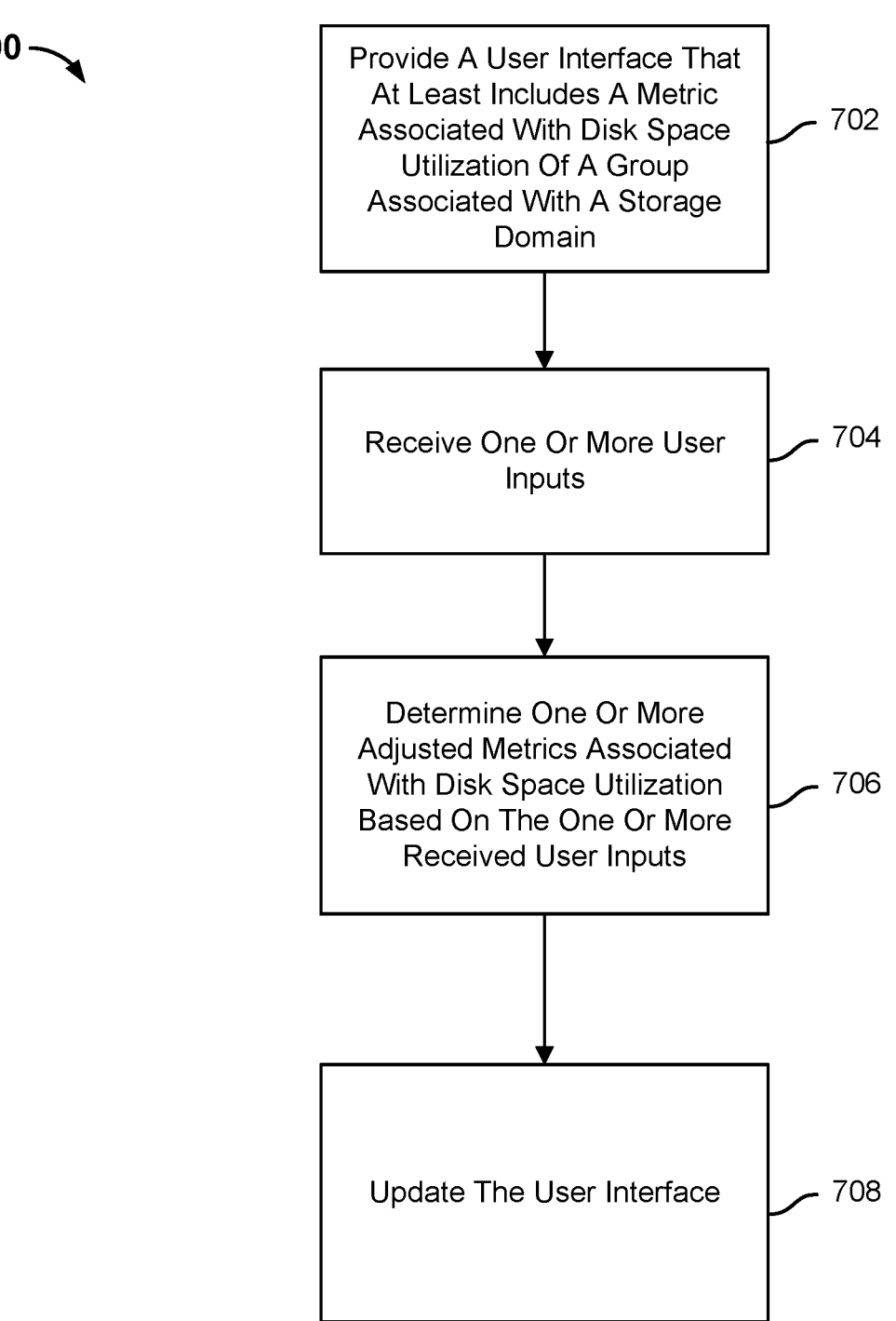
FIG. 7 is a flow chart illustrating a process for providing a metric associated with disk space utilization of a group in accordance with some embodiments.

FIG. 7 is a flow chart illustrating a process for providing a metric associated with disk space utilization of a group in accordance with some embodiments. Process 700 may be implemented by a storage system, such as storage system 112. Process 700 may be implemented to perform some or all of step 510 of process 500.

At 702, a user interface that at least includes a metric associated with disk space utilization of a group is provided. The storage system may provide via a user interface the metric associated with disk space utilization based on a determined incremental disk space utilization of the group. For example, the storage system may provide an amount of provisioned storage capacity used by the data associated with the one or more selected views of data associated with a storage domain, an amount of provisioned storage capacity used by the data associated with the one or more selected views of data associated with a storage domain that is deduplicated, an amount of storage capacity (attributed or actual physical) being used by the one or more selected views of data associated with a storage domain of the group, a rate at which the data associated with the group is using the storage space provisioned to the data group by an entity associated with the storage space, an expected amount of time before the data associated with the group uses the complete amount of storage space provisioned to the data group by an entity associated with the storage space, etc.

At 704, one or more user inputs are received. Disk space utilization is provided for a group of selected views of data associated with a storage domain. The one or more user inputs may select a subgroup of the group of selected views. The subgroup may include some of the selected views.

In the event the data group corresponds to a tenant, the group of selected views may include one or more departments associated with a tenant, one or more protection job types, and/or one or more file types. The subgroup may include a subset of the one or more departments associated with the tenant, a subset of the one or more protection job types, and/or a subset of the one or more file types. The one or more data group inputs may add one or more additional views to the group.

At 706, one or more adjusted metrics associated with disk space utilization are determined based on the one or more received user inputs. The incremental disk space utilization of the group may change based on the one or more received inputs. For example, the incremental disk space utilization for files of a virtual machine file type may be determined. In the event the data group corresponds to a tenant, the incremental disk space utilization for all data associated with an engineering department included in the group but excluding all data associated with a marketing department included in the group may be determined.

At 708, the user interface is updated. The user interface is updated to provide the one or more adjusted metrics associated with disk space utilization.

FIG. 8 is a flow chart illustrating a process for managing a deduplicated storage in accordance with some embodiments. Process 800 may be implemented by a storage system, such as storage system 112. Process 800 may be used to perform some or all of step 512 of process 500.

At 802, a trajectory associated with disk space utilization associated with a group is determined. A group is comprised of one or more selected views of data associated with a storage domain. The disk space utilization associated with the group corresponds to the amount of storage space used by the data associated with the group of the one or more selected views of data associated with the storage domain. The amount of storage space may be determined on a periodic basis (e.g., every day, every week, every month, etc.) or in response to a user command. A data point for the trajectory associated with disk space utilization associated with the group is determined each time the amount of storage space is determined. The data point may be based on amount of storage space used and a date. A plurality of data points for the trajectory associated with disk space utilization associated with the group may be plotted based on the plurality of data points.

The trajectory associated with disk space utilization associated with the group may project a date when the amount of storage capacity used by the group reaches the total amount of storage capacity provisioned by an entity associated with the storage system to a user associated with the data group.

At 804, an indication is provided via a user interface. The indication indicates when the amount of storage space used by the group reaches the total amount of storage capacity provisioned by an entity associated with the storage system to a user associated with the data group.

At 806, one or more user inputs that modify one or more policies are received. The one or more user inputs may modify a corresponding frequency at which one or more protection jobs are performed. For example, a backup frequency may be modified from twice-a-day to once-a-day. The one or more user inputs may modify a retention policy associated with views of data. For example, the retention policy may be modified such that views are retained for 30 days instead of being retained for 90 days.

At 808, a modified trajectory associated with disk space utilization associated with the group is determined. The storage system may recalculate the trajectory associated with disk space utilization based on the one or more user inputs. In some embodiments, the number of views included in the group is decreased. This may reduce the rate at which the storage capacity used by the tenant reaches the storage capacity provisioned to the data group by an entity associated with the storage system.

At 810, the modified trajectory is provided via the user interface.

At 812, an indication to maintain the deduplicated storage based on the modified trajectory is received. For example, a user associated with the data group may indicate that the data group wants to keep the changes to maintain the modified trajectory. At 814, the deduplicated storage is maintained based on the modified trajectory. For example, the storage system may retain certain views for 30 days instead of 90 days.

Figure 9:
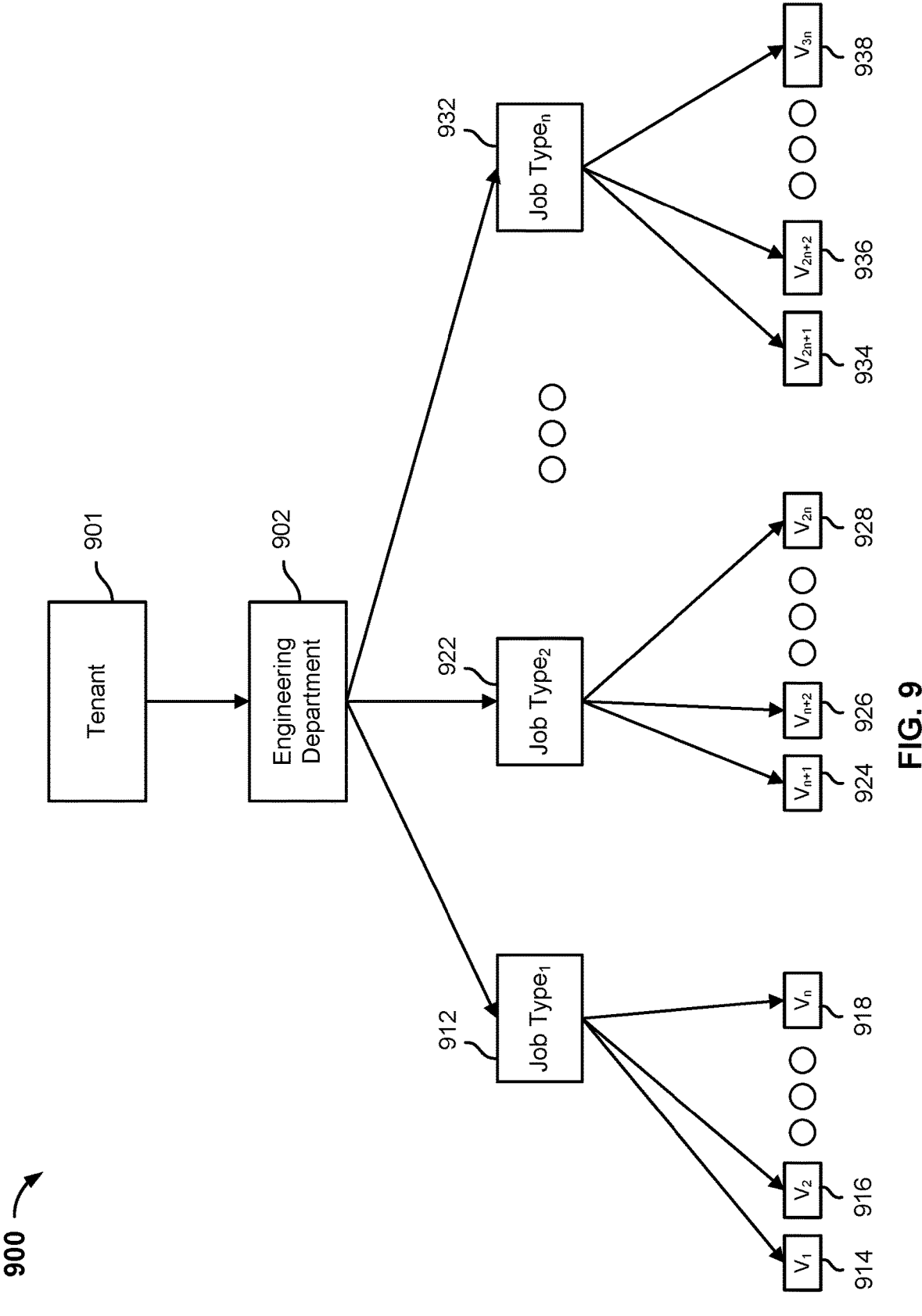
FIG. 9 is a diagram illustrating a nested group in accordance with some embodiments.

FIG. 9 is a diagram illustrating a nested group in accordance with some embodiments. In the example shown, nested group 900 is associated with tenant 901. Tenant 901 is comprised of one or more departments. For example, the tenant may be comprised of an engineering department, a marketing department, a sales department, a human resources department, etc. A storage system may store data associated with each of the one or more departments. In the example shown, tenant 901 is associated with engineering department 902, but tenant 901 may be associated with one or more other departments (not shown). Engineering department 902 may correspond to a department selected by a user associated with tenant 901.

A storage system may perform one or more protection job types for a department. For example, the storage system may perform backup, replication, restore, migration, etc. Although nested group 900 shows engineering department 902 being associated with three different job types, a department may be associated with n job types.

Each job type is associated with n views of data. Job type$_1$ 912 is associated with views 914, 916, 918. Job type$_2$ 922 is associated with views 924, 926, 928. Job type$_n$ 932 is associated with views 934, 936, 938.

A user associated with the tenant may select one or more views of data associated with a storage domain to be included in the group associated with the tenant by selecting a combination of one or more departments associated with the tenant, one or more protection job types associated with each of the one or more departments, and/or one or more file types to be included in the group associated with the tenant.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

selecting, from a plurality of views within a first storage domain, a plurality of different views having a respective size of data associated with any given view that is larger than at least one hundred; gigabytes;

traversing the plurality of different views of data associated with the first storage domain stored on a deduplicated storage to determine data chunks belonging to each view of the plurality of different views of data associated with the first storage domain, wherein the deduplicated storage separately deduplicates the data associated with the first storage domain from data associated with one or more other storage domains, wherein at least a first copy and a second copy of a file are stored by the deduplicated storage and the first copy of the file is included in the data associated with the first storage domain and the second copy of the file is included in the data associated with a second storage domain;

receiving a request for a metric associated with disk space utilization of a group of one or more selected views of data associated with the first storage domain included in the plurality of different views of data associated with the first storage domain that are stored on the deduplicated storage;

identifying data chunks belonging to the one or more selected views of data associated with the first storage domain of the group, wherein the identified data chunks include the first copy of the file, and wherein at least one of the identified data chunks has a different size relative to at least another one of the identified data chunks;

determining an incremental disk space utilization of the group including by determining a total size of the identified data chunks by computing a sum of a size corresponding to each of the identified data chunks;

providing the metric associated with disk space utilization based on the determined incremental disk space utilization of the group; and using the metric associated with the disk space utilization to manage the deduplicated storage.

2. The method of claim 1, wherein to manage the deduplicated storage comprises determining a trajectory associated with disk space utilization associated with the group.

3. The method of claim 2, wherein to manage the deduplication storage further comprises adjusting one or more polices associated with the deduplicated storage.

4. The method of claim 3, wherein the one or more policies associated with the deduplicated storage include a storage policy.

5. The method of claim 4, wherein the storage policy indicates a duration in which the plurality of different views of data associated with the first storage domain are retained by the deduplicated storage.

6. The method of claim 3, wherein the one or more policies associated with the deduplicated storage include a protection policy.

7. The method of claim 6, wherein the protection policy indicates a frequency at which backups of a source system are performed.

8. The method of claim 1, wherein to manage the deduplicated storage comprises deleting one or more of the selected views of data associated with the first storage domain included in the plurality of different views of data associated with the first storage domain.

9. The method of claim 8, wherein the incremental disk space utilization of the group corresponds to an amount of reclaimed storage capacity associated with the deleting one or more of the selected views of data included in the plurality of different views of data.

10. The method of claim 9, wherein the amount of reclaimed storage capacity corresponds to an attributed storage capacity.

11. The method of claim 9, wherein the amount of reclaimed storage capacity corresponds to an actual physical storage capacity.

12. The method of claim 1, wherein the group of one or more selected views of data associated with the first storage domain includes at least one of one or more departments associated with one or more of a tenant, one or more protection job types associated with the tenant, or one or more file types associated with the tenant.

13. The method of claim 1, wherein at least one of the identified data chunks is not deduplicated within the first storage domain.

14. The method of claim 1, wherein at least one of the identified data chunks is deduplicated among the one or more selected views of data associated with the first storage domain of the group but not deduplicated with other views of the plurality of different views of data associated with the first storage domain that are stored on the deduplicated storage.

15. The method of claim 1, wherein providing the metric associated with disk space utilization based on the determined incremental disk space utilization of the group comprises:

providing via a user interface the metric associated with disk space utilization;

receiving one or more user inputs via the user interface;

determining one or more adjusted metrics associated with disk space utilization based on the one or more received user inputs; and updating the user interface to provide the one or more determined adjusted metrics associated with disk space utilization.

16. The method of claim 15, wherein the one or more inputs adjusts the one or more selected views of data associated with the first storage domain that are included in the group.

17. The method of claim 1, wherein the metric associated with disk space utilization of the group comprises at least one of a first amount of storage space used by the data associated with the one or more selected views of data associated with the first storage domain, a second amount of storage space used by the data associated with the one or more selected views of data associated with the first storage domain that is deduplicated, a rate at which the data associated with the group is using the storage space provisioned to a data group by an entity associated with the deduplicated storage, or an expected amount of time before the data associated with the group uses a complete amount of storage space provisioned to the data group by the entity associated with the deduplicated storage.

18. Non-transitory computer readable storage media having instructions stored thereon that, when executed, cause one or more processors to:

selecting, from a plurality of views within a first storage domain, a plurality of different views having a respective size of data associated with any given view that is larger than at least one hundred gigabytes;

traverse the plurality of different views of data associated with the first storage domain stored on a deduplicated storage to determine data chunks belonging to each view of the plurality of different views of data associated with the first storage domain, wherein the deduplicated storage separately deduplicates the data associated with the first storage domain from data associated with one or more other storage domains, wherein at least a first copy and a second copy of a file are stored by the deduplicated storage and the first copy of the file is included in the data associated with the first storage domain and the second copy of the file is included in the data associated with a second storage domain;

receive a request for a metric associated with disk space utilization of a group of one or more selected views of data associated with the first storage domain included in the plurality of different views of data associated with the first storage domain that are stored on the deduplicated storage;

identify data chunks belonging to the one or more selected views of data associated with the first storage domain of the group, wherein the identified data chunks includes the first copy of the file, and wherein at least one of the identified data chunks has a different size relative to at least another one of the identified data chunks;

determine an incremental disk space utilization of the group including by determining a total size of the identified data chunks by computing a sum of a size corresponding to each of the identified data chunks;

provide the metric associated with disk space utilization based on the determined incremental disk space utilization of the group; and use the metric associated with the disk space utilization to manage the deduplicated storage.

19. A system, comprising:

a processor configured to:

select, from a plurality of views within a first storage domain, a plurality of different views having a respective size of data associated with any given view that is larger than at least one hundred gigabytes;

traverse the plurality of different views of data associated with the first storage domain stored on a deduplicated storage to determine data chunks belonging to each view of the plurality of different views of data associated with the first storage domain, wherein the deduplicated storage separately deduplicates the data associated with the first storage domain from data associated with one or more other storage domains, wherein at least a first copy and a second copy of a file are stored by the deduplicated storage and the first copy of the file is included in the data associated with the first storage domain and the second copy of the file is included in the data associated with a second storage domain;

receive a request for a metric associated with disk space utilization of a group of one or more selected views of data associated with the first storage domain included in the plurality of different views of data associated with the first storage domain that are stored on the deduplicated storage;

identify data chunks belonging to the one or more selected views of data associated with the first storage domain of the group, wherein the identified data chunks includes the first copy of the file, and wherein at least one of the identified data chunks has a different size relative to at least another one of the identified data chunks;

determine an incremental disk space utilization of the group including by determining a total size of the identified data chunks by computing a sum of a size corresponding to each of the identified data chunks;

provide the metric associated with disk space utilization based on the determined incremental disk space utilization of the group; and using the metric associated with the disk space utilization to manage the deduplicated storage; and a memory coupled to the processor and configured to provide the processor with instructions.

* * * * *